United States Patent [19]

Boudreau et al.

[11] Patent Number: 4,587,609
[45] Date of Patent: May 6, 1986

[54] LOCKOUT OPERATION AMONG ASYNCHRONOUS ACCESSERS OF A SHARED COMPUTER SYSTEM RESOURCE

[75] Inventors: Daniel A. Boudreau, Billerica; James M. Sandini, Berlin; Edward R. Salas, Billerica, all of Mass.

[73] Assignee: Honeywell Information Systems Inc., Waltham, Mass.

[21] Appl. No.: 510,472

[22] Filed: Jul. 1, 1983

[51] Int. Cl.[4] .......................... G06F 13/14; G06F 9/46
[52] U.S. Cl. .................................................. 364/200
[58] Field of Search ... 364/200 MS File, 900 MS File

[56] References Cited

U.S. PATENT DOCUMENTS

| | | |
|---|---|---|
| 3,623,011 | 11/1971 | Baynard, Jr. et al. ............... 364/200 |
| 3,631,405 | 12/1971 | Hoff et al. ............... 364/200 |
| 3,641,505 | 2/1972 | Artz et al. ............... 364/200 |
| 3,725,872 | 4/1973 | Balogh, Jr. et al. ............... 364/200 |
| 3,820,079 | 6/1974 | Bergh et al. ............... 364/200 |
| 3,827,029 | 7/1974 | Schlotterer et al. ............... 364/200 |
| 3,889,237 | 6/1975 | Alferness et al. ............... 364/200 |
| 4,000,485 | 12/1976 | Barlow et al. ............... 364/200 |
| 4,136,386 | 1/1979 | Annunziata et al. ............... 364/200 |
| 4,228,496 | 10/1980 | Katzman et al. ............... 364/200 |
| 4,237,534 | 12/1980 | Felix ............... 364/200 |
| 4,276,594 | 6/1981 | Morley ............... 364/200 |
| 4,298,928 | 11/1981 | Etoh et al. ............... 364/200 |
| 4,318,182 | 3/1982 | Bachman et al. ............... 364/200 |
| 4,319,324 | 3/1982 | Johnson et al. ............... 364/200 |
| 4,320,455 | 3/1982 | Woods et al. ............... 364/200 |
| 4,323,967 | 4/1982 | Peters et al. ............... 364/200 |
| 4,484,270 | 11/1984 | Quernemoen et al. ............... 364/200 |
| 4,488,217 | 12/1984 | Binder et al. ............... 364/200 |
| 4,507,730 | 3/1985 | Johnson et al. ............... 364/200 |
| 4,521,848 | 6/1985 | Bruce et al. ............... 364/200 |
| 4,558,429 | 10/1985 | Barlow et al. ............... 364/900 |

Primary Examiner—James D. Thomas
Assistant Examiner—A. Williams, Jr.
Attorney, Agent, or Firm—William A. Linnell; George Grayson; John S. Solakian

[57] ABSTRACT

A data processing system having a plurality of units includes a shareable unit which is shareable between two or more of the other units. Lock apparatus is provided in the shareable unit to allow a first unit to lock the shareable unit so that no other unit attempting to lock the shareable unit will be permitted access to the shareable unit. The lock apparatus includes means that permit two units desiring to lock the shareable unit to make simultaneously asynchronous requests to lock the shareable unit. The lock apparatus further includes means to permit the unit which has locked the shareable unit to unlock the shareable unit so that it becomes available for a subsequent lock by a unit. The lock apparatus also includes means to allow the shared unit to be accessed by other units not attempting to lock the shareable unit even when the shareable unit is locked.

19 Claims, 10 Drawing Figures

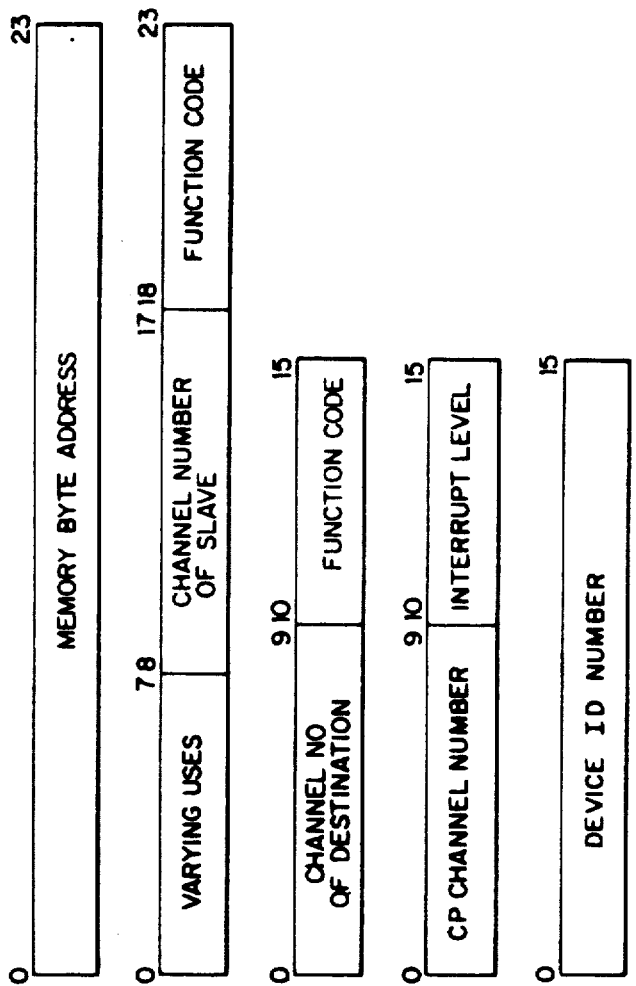

LOCKOUT OPERATION AMONG ASYNCHRONOUS ACCESSERS OF A SHARED COMPUTER SYSTEM RESOURCE

RELATED APPLICATIONS

The following patent applications, which are assigned to the same assignee as the instant application, have related subject matter and are incorporated herein by reference. Certain portions of the system and processes herein disclosed are not our invention, but are the invention of the below-named inventors as defined by the claims in the following patent applications:

| TITLE | INVENTORS | SERIAL NO. |
|---|---|---|
| Priority Resolver With Lowest Priority Level Having Shortest Logic Path | Daniel A. Boundreau, Edward R. Salas | 449,703 |
| Distributed Priority Network Logic For Allowing A Low Priority Unit to Reside In A High Priority Position | Daniel A. Boudreau, Edward R. Salas, James M. Sandini | 453,406 (now U.S. Pat. No. 4,559,595) |
| Technique For Determining Maximum Physical Memory Present In A System And For Detecting Attempts To Access Nonexistent Memory | Daniel A. Boudreau, Edward R. Salas | 481,107 |
| Asynchronous Multiport Parallel Access Memory System For Use In A Single Board Computer System | Daniel A. Boudreau, Edward R. Salas | 504,751 |

BACKGROUND OF THE INVENTION

1. Field of the Invention

The present invention generally relates to data processing systems and more particularly to a lock operation which provides that one user, or a possible plurality of users, of a shared resource is given exclusive use of the shared resource during the period of time in which the shared resource is locked.

In a system having a plurality of devices coupled to a shared resource, an orderly system must be provided by which one of the user devices may obtain the exclusive use of the shared resource for certain types of operations. During this period of exclusive use by one of the devices performing an operation which requires exclusivity, the other device wishes to perform an operation which also requires the exclusive use of the shared resource. This problem becomes more complicated when such devices include, for example, one or more data processors, one or more memory units, and various types of peripheral devices such as magnetic tape storage devices, disk storage devices, card reading equipment and the like.

2. Description of the Prior Art

Various methods and apparatus are known in the prior art for interconnecting such a system. Such prior art systems range from those having common data bus paths to those having special paths between various devices. Such systems also may include a capacity for either synchronous or asynchronous operation in combination with the bus type. Some such systems, independent of the manner in which such devices are connected or operated, require the data processor to control any such data transfer on the bus even though, for example, the transfer may be between devices other than the data processor.

One such structural scheme is shown in U.S. Pat. No. 4,000,485 entitled, "Data Processing System Providing Lock Operation of Shared Resources". This patent describes a data processing system which the shared resource is the main memory which is connected to a common bus over which all transfers to and from device controllers and the central processing unit occur. In this system, if the central processing unit wants to perform a read-modify-write operation on the contents of the locaton in main memory, the data processing system first locks the main memory containing the location to be read and updated so that during the multiple common bus cycles required to first read a memory location and then write it back can be performed uninterrupted without another central processing system or device controller being able to perform another lock operation until the first lock operation has been completed. In this system, although the common bus is an asynchronous bus (any device wishing to make a transfer over the common bus may asynchronously request use of the bus at any time, if the bus is not already in use), there is a priority resolver such that the lock mechanism associated with the shared resource need not be able to handle the case in which the shared resource is being locked by a first requester and a second lock request is made asynchronously from a second requester wishing to perform a lock operation on the shared resource.

With the development of dual ported memories, it has become possible that multiple users may be making simultaneous requests to perform a lock operation on the shared resource. For example, if one port is connected to the common bus which connects device controllers to the main memory and the second port is connected to the central processing unit, it is possible that a device controller may be attempting to perform a lock operation on the main memory at the same time that the central processor wants to perform a lock operation. Therefore, what is needed is a lock mechanism for a shared resource in which competing asynchronous requests from multiple requesters to lock or unlock the shared resource can be handled.

OBJECTS OF THE INVENTION

Accordingly, it is an object of the present invention to provide an improved locking mechanism for shared resources in which multiple asynchronous requests to lock a shared resource may be resolved.

It is a still further object of the present invention to provide a low cost locking mechanism for shared resources.

This invention is pointed out with particularity in the appended claims. An understanding of the above and further objects and advantages of this invention can be obtained by referring to the following description taken in conjunction with the drawings.

SUMMARY OF THE INVENTION

The above and other objects of the invention are obtained by providing lock logic within a data processing system comprising a plurality of units coupled by means of a common bus to transfer information between any two of the plurality of units. The plurality of units includes at least a first and second unit, the first unit being a resource capable of being shared by at least the second unit and a third unit and wherein the second unit and third unit operate asynchronously with respect to one another and both are capable of making requests for the uninterrupted use of the first unit. A first storage means is included in the first unit for storing a lock signal from the second unit or any other unit of the plurality of units, the lock signal indicating that the second or other unit which issues the lock signal desires uninterrupted access to the first unit. A second storage means is provided in the first unit for storing an indication that the third unit desires uninterrupted access to the first unit. A third storage means is provided which stores the indication of the second storage means at the time the second unit presents the lock signal. Logic is further provided in the first unit which is responsible to the indication of the first storage means and the third storage means to generate a positive acknowledgement to the second unit if, when the second unit requests uninterrupted access to the shared unit, neither the first storage means nor the third storage means indicates that uninterrupted access to the shared resource has been requested. This same logic also generates a negative response to the second unit if, when the second unit presents the lock signal, either the first storage means or the third storage means indicates that uninterrupted access to the shared resource has been requested. Logic is also provided to store the status of the lock signal in the first storage means whenever a positive acknowledgement is generated to any of the plurality of units on the common bus. Further logic is included in the first unit that is responsive to an unlock signal such that the first storage means will be reset if a positive acknowledgement is generated by the first unit in response to a unlock signal presented by any of the plurality of units on the common bus. Logic is also provided which inhibits the third unit from gaining access to the first unit if the first storage means indicates that a unit of the plurality of units desires uninterrupted access to the shared unit. Further means is provided for resetting the second storage means once the second unit has completed the operation which requires uninterrupted access to the shared unit.

BRIEF DESCRIPTION OF THE DRAWINGS

The manner in which the method of the present invention is performed and the manner in which the apparatus of the present invention is constructed and its mode of operation can best be understood in light of the following detailed description together with the accompanying drawings in which like reference numbers identify like elements in the several figures and in which:

FIGS. 2 through 6 illustrate the format of various information transferred over the common bus of the data processing system of FIG. 1;

DESCRIPTION OF THE PREFERRED EMBODIMENT

DATA PROCESSING SYSTEM CONTAINING THE LOCK LOGIC

Figure 1:
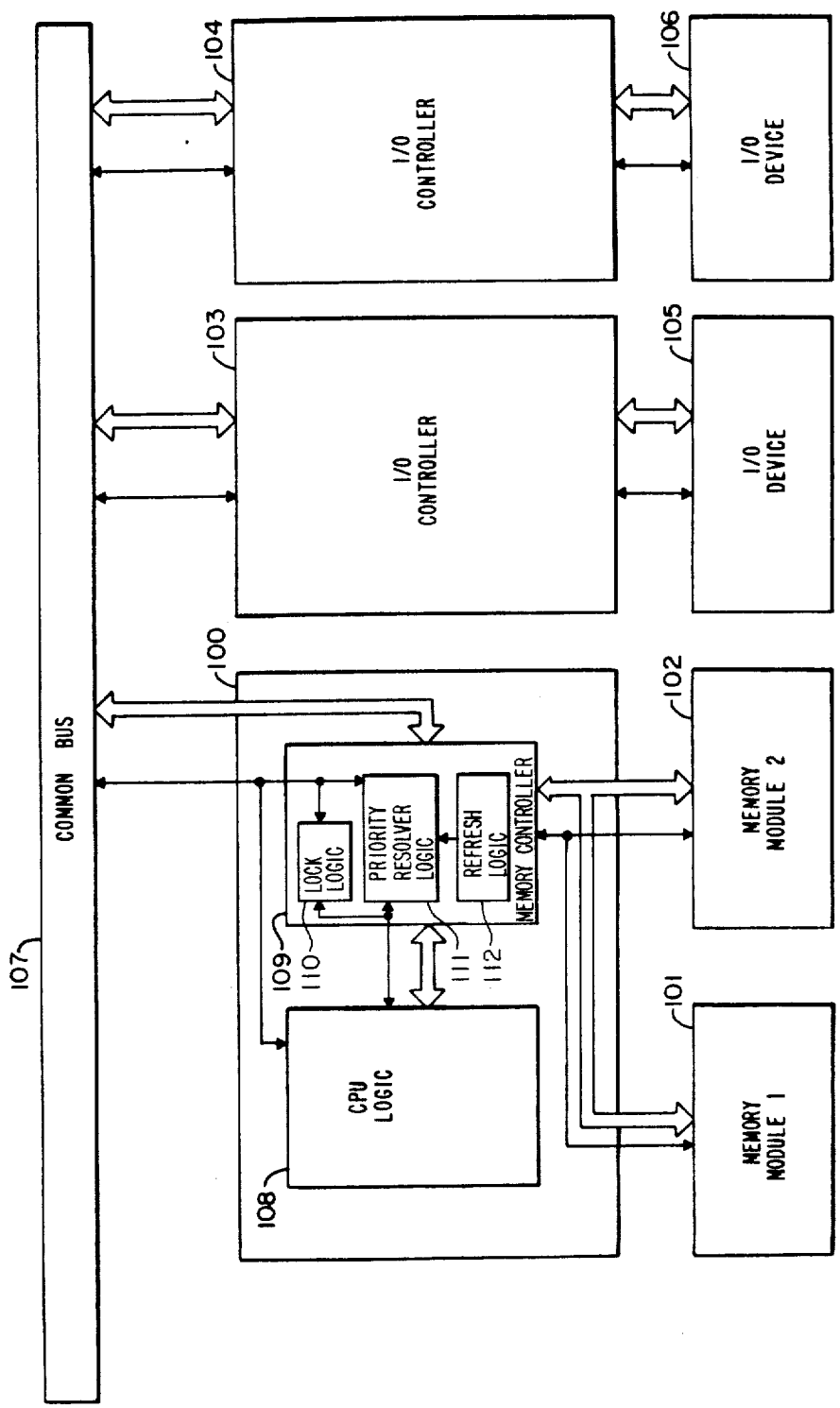
FIG. 1 is a general block diagram of a data processing system containing the lock logic of the present invention.

FIG. 1 shows a data processing system of the preferred embodiment which comprises of a CPU/memory board 100, memory module 1 101, memory module 2 102, a first I/O controller 103 with an attached I/O device 105 and a second I/O controller 104 with an attached I/O device 106, and common bus 107. In FIG. 1, the thinner lines connecting the various components are control lines and the thicker lines connecting the components are data/address lines.

CPU/memory board 100 is a single printed circuit board which connects to common bus 107. CPU/memory board 100 contains both the CPU logic 108 and the memory controller logic 109. There is no main memory contained within CPU/memory board 100. The main memory for holding data and software instructions is provided by connecting one or more memory modules such as memory module 1 101 and memory module 1 102 to CPU/memory board 100. All requests to access the main memory contained in memory module 1 and memory module 2, which can be from either the CPU or an I/O controller, are via memory controller logic 109. Memory controller logic 109 is dual ported. One port connects to common bus 107 so that memory requests and data transfers can be made by either I/O controller 103 or I/O controller 104 via common bus 107. Requests for memory from the CPU logic 108 for data or software instructions normally take place directly between CPU logic 108 via the second port of memory controller logic 109 without going via common bus 107.

Within the preferred embodiment, each memory module 101 and 102 can contain, for example, 256K (1K=1024) words of main memory. In the preferred embodiment, each word of memory contains 16 bits of data which can also be addressed as two 8-bit bytes. In the preferred embodiment, the memory is comprised of MOS semiconductor chips with each location in memory actually containing 22 bits of information. Sixteen of the bits are used for the 16 bits of data in the word and 6 bits are used for error detection and correction (EDAC). Each memory module is a separate physical printed circuit board which contains 88 MOS memory chips of 64K bits each. Memory controller logic 109 is comprised of lock logic 110, priority resolver 111, and refresh logic 112. In addition, memory controller logic 109 contains timing, error detection and correction logic and chip addressing logic which is not shown in FIG. 1.

Lock logic 110 is provided to lock the main memory under the command of either the CPU or an I/O controller against another lock operation being performed by either an I/O controller or the CPU until the main memory is unlocked. Priority resolver logic 111 is provided to resolve competing requests for access to main memory. Priority must be resolved between main memory access requests originating: from the CPU 108, from an I/O controller 103 or 104 via common bus 107 or from refresh logic 112.

Priority resolver logic 111 is designed such that each time the main memory becomes available, a resolution cycle takes place that examines all three possible sources of access requests and will assign the main memory first to a request from refresh logic 112. If no refresh request is present, it will assign the main memory to a request from common bus 107 which originated from an I/O controller. If neither a refresh request nor a bus request is present, it will assign the main memory to the CPU 108 if it is making a request. The operation of priority resolver logic 111 is described in greater detail in U.S. Patent Application Ser. No. 449,703 entitled, "Priority Resolver With Lowest Priority Level Having Shortest Logic Path", which is incorporated herein by reference. Refresh logic 112 is provided to periodically perform a refreshing of the data stored in the volatile MOS memory chips of memory module 1 101 and memory module 2 102.

BUS REQUEST AND RESPONSE CYCLES

The common bus 107 of the system of the preferred embodiment provides a communication path between two units in the system. The common bus 107 is asynchronous in design enabling units of various speeds connected to the bus to operate efficiently in the same system. The design of the bus of the present invention permits communications including memory transfers, interrupts, data, status and command transfers. For a further description of the bus and interface logic of such system, U.S. Pat. No. 3,993,981, issued on Nov. 23, 1976 and U.S. Pat. No. 4,236,203, issued on Nov. 25, 1980, which are incorporated herein by reference, should be consulted.

The common bus 107 permits any two units to communicate with each other at a given time via common shared signal paths. Any unit wishing to communicate requests a bus cycle. When that bus cycle is granted, that unit becomes the master and may address any other unit in the system as the slave. Some types of bus interchange require a response cycle (a single fetch memory read, for example). In cases where a response cycle is required, the requester assumes the role of master, indicates that a response is required, and identifies itself to the slave. When the required information becomes available (depending on slave response time), the slave then assumes the role of master and initiates a transfer to the requesting unit. This completes the single fetch interchange which has taken two bus cycles in this case. Intervening time on the bus between these two cycles (the request cycle and the response cycle) may be used for other system traffic not involving these two units.

BUS SIGNALS

A master may address any other unit on the bus as a slave. It does this by placing the slave address on the address leads. There may be 24 address leads, for example, which can have either of two interpretations depending on the state of an accompanying control lead called the memory reference signal (BSMREF-). If the memory reference signal is a binary ZERO, the format of FIG. 2 applies to the address leads with the 24th such lead being the least significant bit. It should be noted that as used in this specification, the terms binary ZERO and binary ONE are used respectively to refer to the low and high states of electrical signals. If the memory reference signal is a binary ONE, the format for such 24 bits as shown in FIG. 3 applies. In essence, when the memory is being addressed, the bus enables up to 2 to the 24th power bytes to be directly addressed in memory. When units are passing control information, data or interrupts, they address each other by channel number. The channel number allows up to 2 to the 10th power channels to be addressed by the bus. Along with the channel number, a six bit function code is passed which specifies which of up to 2 to the 6th power possible functions this transfer implies.

When a master requires a response cycle from the slave, it indicates this to the slave by one state (read command) of a control lead named BSWRIT- (the other state thereof not requiring a response, i.e., a write command). In this case, the master provides its own identity to the slave by means of a channel number. The data leads, as opposed to the bus address leads, are coded in accordance with the format of FIG. 4 to indicate the master's identity when a response is required from the slave. The response cycle is directed to the requester by a non-memory reference transfer. The control lead, indicated as a second-half bus cycle (BSSHBC-), is enabled to designate that this is the awaited cycle (as compared to an unsolicited transfer from another unit). When a master requires a double fetch from a slave, it indicates this to the slave by one state of a control lead named BSDBPL- (the other state thereof not requiring a double fetch, i.e., a single fetch). When the slave responds to the master's request, one state of this same control lead (BSDBPL-) is used to indicate to the requesting unit that this response cycle is the first response cycle of two response cycles (the other state thereof indicating that this is the last response cycle of a double fetch operation).

A distributed tie-breaking network provides the function of granting bus cycles and resolving simultaneous requests for use of the bus. For the most part, priority is granted on the basis of physical position on the bus, the highest priority being given to the first unit on the bus. The logic to accomplish the tie-breaking function is distributed among all units connected to the bus and is fully described in U.S. Pat. No. 4,030,075, and an improvement thereof described in U.S. Pat. No. 4,096,569, both of which are incorporated herein by reference. In a typical system, the memory is granted the highest priority and the central processor is granted the lowest priority with the other units being positioned on the basis of their performance requirements. In the system of the preferred embodiment, which is illustrated in FIG. 1, both the CPU logic and the memory controller are on one printed circuit board which is positioned at the high priority end of the common bus and the priority logic has been improved to allow the CPU to be assigned the lowest priority as is described in U.S. patent application Ser. No. 453,406 entitled, "Distributed Priority Network Logic for Allowing a Low Priority Unit to Reside in a High Priority Position", which is incorporated herein by reference.

Thus, referring to FIG. 1, a typical system of the present invention includes a multiline common bus 107 coupled with a CPU, a memory and one or more I/O devices and controller, such memory controller 109 having the highest priority and CPU logic 108 having the lowest priority with the I/O controllers 103 and 104 having intermediate priorities. Further, each one of such units includes address logic for recognizing its channel number or memory address. The address logic for a typical basic device controller is also discussed in U.S. Pat. No. 4,030,075.

A channel number will exist for every end point in a particular system, with the exception of the memory type processing elements which are identified by the memory address. A channel number is assigned for each such device. Full duplex devices as well as half-duplex devices utilize two channel numbers. Output only or input only devices use only one channel number each. Channel numbers are easily variable and, accordingly, one or more hexadecimal rotary switches (thumb wheel switches) may be utilized for each such unit connected with the bus to indicate or set the unit's address. Thus, when a system is configured, the channel number may be designated for the particular unit connected to the bus as may be appropriate for that particular system. Units with multiple input/output (I/0) ports generally will require a block of consecutive channel numbers. By way of example, a four port unit may use rotary switches to assign the upper 7 bits of a channel number and may use the lower order 3 bits thereof to define the port number and to distinguish input ports from output ports. The channel number of the slave unit will appear on the address bus for all non-memory transfers as shown in FIG. 3. Each unit compares that number with its own internally stored number (internally stored by means of the rotary switches). The unit which achieves a compare is, by definition, the slave and must respond to that cycle. Generally, no two points in a single system will be assigned to the same channel number. As shown in FIG. 3, a specific bus or I/O function can be performed as indicated by bits 18 through 23 of the bus address leads for non-memory transfers. Function codes may designate output or input operations. All odd function codes designate output transfers (write) while all even function codes designate input transfer requests (read). For example, a function code of 00(base 16) may be used to indicate a single fetch memory read and a function code of 20(base 16) may be used to indicate a double fetch read operation. The central processor examines the least significant bit, 23, of the 6 bit function code field for an input/output command and uses a bus lead to designate the direction.

There are various output and input functions. One of the output functions is a command whereby a data quantity, for example 16 bits, is loaded into the channel from the bus. The meanings of the individual data bits are component specific, but the data quantity is taken to mean the data to be stored, sent, transmitted, etc., depending upon the specific component functionality. Another such output function is a command whereby, for example, a 24 bit quantity is loaded into a channel address register (not shown in the figures). The address is a memory byte address and refers to the starting location in memory where the channel will commence input or output of data. Various other output functions include an output range command which defines the size of the memory buffer assigned to the channel for a specific transfer, an output control command which by its individual bits causes specific responses, output task functions such as print commands, output configuration which is a command to indicate functions such as terminal speed, card read mode, etc., and output interrupt control which is a command which loads, for example, a 16 bit word into the channel with the format as shown in FIG. 5. The first 10 bits (bits 0 through 9) indicate the central processor channel number and bits 10 through 15 indicate the interrupt level. Upon interrupt, the central processor channel number is returned on the address bus while the interrupt level is returned on the data bus. The input functions include functions similar to the output functions except in this case the input data is transferred from the device to the central processor via the bus.

As previously discussed, a unique device identification number is assigned to every different type of device which is connected to the bus. This number is presented on the bus in response to the input function command entitled input device identification. This number is placed on the data bus in the format shown in FIG. 6. For convenience, the number is separated into 13 bits identifying the device (bits 0 through 129 and three bits identifying certain functionality of the device (bits 13 through 15) as may be required.

BUS TIMING

Figure 7:
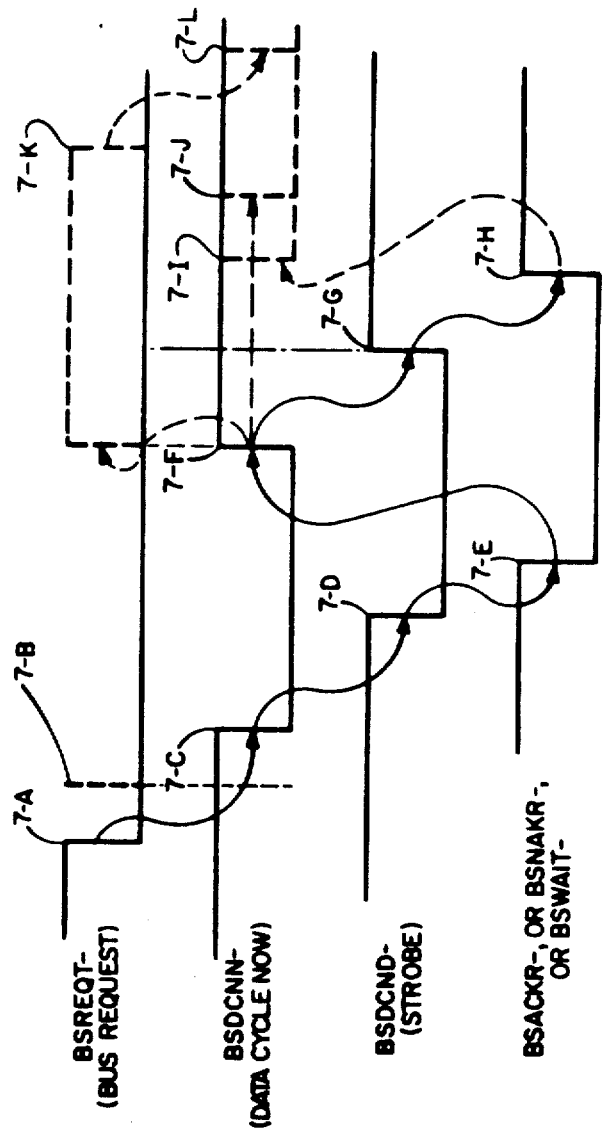
FIG. 7 illustrates a timing diagram of the operation of the bus of the data processing system of FIG. 1.

FIG. 7 illustrates the bus timing diagram and will be discussed more specifically hereinafter. Generally, however the timing is as follows. The timing applies to all transfers from a master unit to a slave unit connected to the bus. The speed at which the transfer can occur is dependent upon the configuration of the system. That is, the more units connected to the bus and the longer the bus, then, due to propagation delays, the longer it takes to communicate on the bus. On the other hand, the lesser amount of units on the bus decreases the response time. Accordingly, the bus timing is truly asynchronous in nature. A master which wishes a bus cycle makes a bus request. The signal BSREQT- is common to all units on the bus and if a binary ZERO, indicates that at least one unit is requesting a bus cycle. When a bus cycle is granted, the signal BSDCNN- becomes a binary ZERO indicating that a tie-breaking function is complete and that one specific master now has control of the bus. At the time the signal BSDCNN- becomes a binary ZERO, the master applies the information to be transferred to the bus. Each unit on the bus develops an internal strobe (BSDCND-) from the signal BSDCNN-. The strobe (BSDCND-) is delayed, for example, approximately 60 nanoseconds from the reception of the binary ZERO state of the BSDCNN- signal. When the delay is complete in the slave, the bus propagation time variations will have been accounted for and each slave unit will have been able to recognize its address (memory address or channel number). The addressed slave can now make one of these responses, either an acceptance (ACK), a non-acceptance (NAK) or a wait (WAIT) signal, or more specifically a BSACKR-, a BSNAKR- or a BSWAIT- signal. The response is sent out on the bus and serves as a signal to the master that the slave has recognized the requested action. The control lines then return to the binary ONE state in the sequence as shown in FIG. 7. Thus, the bus handshake is fully asynchronous and each transition will only occur when the preceding transition has been received. Individual units may therefore take different lengths of time between the strobe and the ACK, etc. transition depending on their internal functionality. A bus time out function exists to prevent hang-ups which could occur if no unit on the bus responds to a request.

Information which is transferred over the bus can include, for example, 50 signals or bits, which may be broken down as follows: 24 address bits, 16 data bits, 5 control bits and 5 integrity bits. These various signals will be discussed hereinafter.

BUS PRIORITY

The common bus request tie-breaking function is that of resolving simultaneous requests from different units for service and granting bus cycles on a basis of a positional priority system. As indicated hereinbefore, the memory has the highest priority and the central processor has the lowest priority even though they both physically reside at one end of the common bus 107. Other units occupy positions along the bus and have priority which increases relative to their proximity to the memory end of the bus. The priority logic is included in each one of the units directly connected to the bus in order to accomplish the tie-breaking function. Each such unit's priority network includes a grant flip-flop. At any point in time, only one specific grant flip-flop may be set and that unit by definition is the master for that specific bus cycle. Any unit may determine at any time that it needs a bus cycle and set its user flip-flop. At any time therefore, many user flip-flops may be set, each representing a future bus cycle. In addition, each unit on the bus contains a request flip-flop. When all units are considered together, the request flip-flops may be considered as a request register. It is the outputs of this register that supply the tie-breaking network which functions to set only one grant flip-flop no matter how may requests are pending. More specifically, if there were no pending users then no request flip-flops would be set. The first user flip-flop to set would cause its request flip-flop to set. This in turn would inhibit, after a short delay as hereinafter described, other devices from setting their request flip-flops. Thus, what occurs is that a snap-shot of all user flip-flops is taken for the given period in time (the delay period). The result is that a number of request flip-flops may be set during this delay period depending upon their arrival. In order to allow the request flip-flops to have their outputs become stable, each unit includes such delay in order to insure that such stabilization has occurred. A particular grant flip-flop is set if the unit associated therewith has had its request flip-flop set and the delay time has elapsed and no higher priority unit wants the bus cycle. A strobe signal is then generated after another delay period and finally the grant flip-flop is cleared (reset) when the master receives an ACK, NAK or WAIT signal from the slave unit.

As indicated hereinbefore, there are three possible slave responses, the ACK, the WAIT or the NAK signal. In addition, there is a fourth state in which there is no response at all. In the case where no unit on the bus recognizes the transfer as addressed to it, no response will be forthcoming. A time out function will then take place and a NAK signal will be generated thereby clearing the bus. An ACK signal will be generated if the slave is capable of accepting the bus transfer from the master and wishes to do so. The WAIT response is generated by the slave if the slave is temporarily busy and cannot accept a transfer at this time. Upon receipt of the WAIT signal, the master will retry the cycle at the next bus cycle granted to it and continue to do so until successful. Some of the conditions which cause a WAIT response from a slave when the central processor is the master are: if the controller is waiting for a response from memory or if the controller has not yet processed the previous input/output command, or in the case of the instant invention, when the controller is the master and attempts to lock memory and the memory is already locked by another controller or the central processor. The NAK signal generated by the slave means it cannot accept a transfer at this time. Upon receipt of a NAK signal, a master unit will not immediately retry but will take specific action depending upon the type of master.

As generally indicated hereinbefore, there are basic timing signals on the bus which accomplish the handshaking function thereof. These five signals, as discussed hereinbefore, are bus request signal (BSREQT-) which when a binary ZERO, indicates that one or more units on the bus have requested the bus cycle; the data cycle now signal (BSDCNN-) which when a binary ZERO indicates a specific master is making a bus transfer and has placed information on the bus for use by some specific slave; the ACK signal (BSACKR-) which is a signal generated by the slave to the master indicating that the slave is accepting this transfer by making this signal a binary ZERO; the NAK signal (BSNAKR-) which is a signal generated by the slave to the master indicating to the master when it is a binary ZERO that the slave is refusing this transfer; and the WAIT signal (BSWAIT-) which is a signal generated by the slave to the master indicating when it is a binary ZERO that the slave is postponing the decision on the transfer.

In addition and as indicated hereinbefore, there may be as many as fifty information signals which are transferred as the information content of each bus cycle. These signals are valid for use by the slave on the leading edge of the strobe signal BSDCND- of FIG. 7. All of the following discussion is by way of example and it should be understood that the number of bits may be changed for different functions. Thus, there may be 16 leads or bits provided for the data. There are 24 leads provided for the address. There is one bit provided for the memory reference signal (BSMREF-) which when a binary ZERO indicates that the address leads contain a memory address. When the memory reference signal is a binary ONE, it indicates that the address leads contain a channel address and a function code as indicated in FIG. 3. There is also provided a byte signal (BSBYTE-) which indicates when it is a binary ZERO that the current transfer is a byte transfer rather than a word transfer, a word typically comprising two bytes. There is also a write signal (BSWRIT-) which indicates when it is a binary ONE that the slave is being requested to supply information to the master. A separate bus transfer will provide this information. There is further provided a second-half bus cycle (BSSHBC-) which is used by the master to indicate to the slave that this is the information previously requested. From the time a pair of units of the bus has started a read operation as indicated by signal (BSWRIT-) until the second cycle occurs completing the transfer of the data read from memory (indicated by BSSHBC-), both units may be busy to all other units on the bus.

BUS LOCK MEMORY OPERATION

In addition to miscellaneous error and parity signals, there is also included a lock signal among the fifty information signals on the bus. The lock signal (BSLOCK-) is used to cause a lock operation to occur. A memory lock operation is a multi-cycle bus transfer whereby a unit may read or write a word or multi-word area of memory without any other unit on the bus or, as will be described below, the CPU being able to break into the operation with another lock operation. This facilitates using memory locations as flags to communicate between asynchronously processing units within the system. The effect of the lock operation is to extend a busy condition beyond the duration of the memory cycle for certain types of operations. Other units on the bus attempting to initiate lock signals before the last cycle is complete will receive a NAK response. The memory will, however, still respond to other (non-locked) memory requests.

Figure 9:
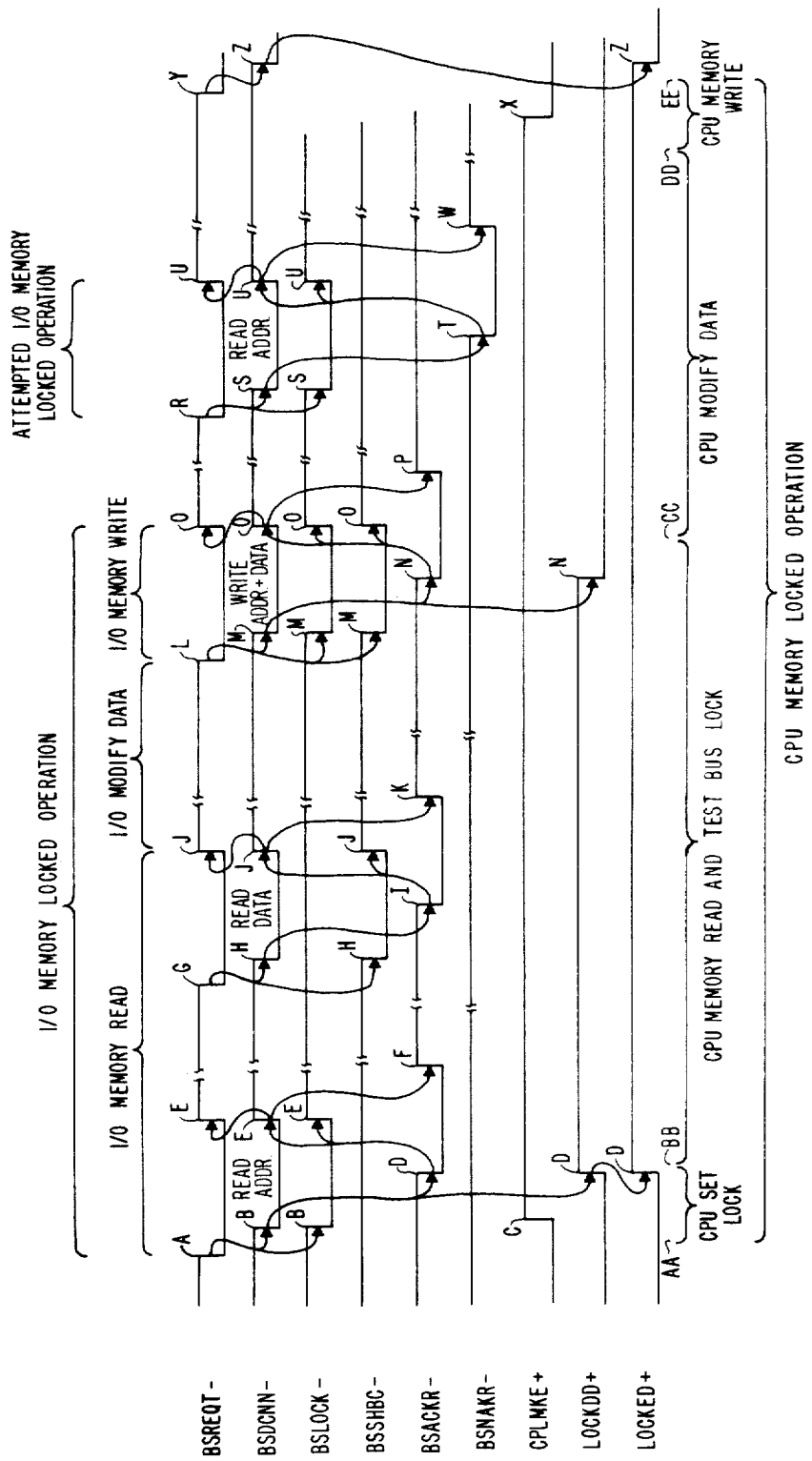
FIG. 9 illustrates a timing diagram of an example operation of the lock logic of FIG. 8.

An example of the lock operation is the read-modify-write cycle, the three bus cycles of which are as follows. During the first bus cycle (time A to F in FIG. 9), the address bus contains the memory address, the data bus contains the channel number of the originator, the signal BSWRIT- is a binary ZERO indicating a response is required, the signal BSLOCK- is a binary ZERO indicating that this is a locked operation and, further, the BSMREF- signal is a binary ONE. During the second bus cycle of the read-modify-write operation (time G to K in FIG. 9), the address bus contains the channel number of the originator, the data bus contains the memory data, the BSSHBC- signal is a binary ZERO denoting a read response and the BSMREF- signal is a binary ONE. During the third bus cycle (time L to P in FIG. 9), the address bus contains the memory address, the data bus contains the memory data, the BSLOCK- signal is a binary ZERO indicating the completion of the read-modify-write operation and the BSMREF- signal is a binary ZERO, and the BSSHBC- signal is a binary ZERO. In addition, the BSWRIT- signal is a binary ONE. Note the above discussion is in general terms and the individual signals may only be in the described state for a portion of the bus cycle as shown in FIG. 9. As in all other operations, the intervening time on the bus between the three bus cycles of the read-modify-write operation can be used by other units not involved in the transfer. In addition, the CPU can access the memory so long as the CPU does not attempt a memory lock operation.

In addition to the other control signals, also provided on the bus may be the bus clear (BSMCLR-) signal which is normally a binary ONE and which becomes a binary ZERO when a master clear operation is performed such as during a power-up sequence of the system.

BUS PRIORITY NET TIMING

The timing diagram of FIG. 7 will now be more specifically discussed in detail with respect to the address logic circuitry of the memory and the central processing unit.

With reference to the timing diagram of FIG. 7 in every bus cycle there are three identifiable parts, more particularly, the period (7-A to 7-C) during which the highest priority requesting device wins the bus, the period (7-C to 7-E) during which the master unit calls a slave unit, and the period (7-E to 7-G) during which the slave responds. When the bus is idle, the bus request signal (BSREQT-) is a binary ONE. The bus request signal's negative going edge at time 7-A starts a priority net cycle. There is an asynchronous delay allowed within the system for the priority net to settle (at time 7-B) and a master user of the bus to be selected. The next signal on the bus is the BSDCNN- or data cycle now signal. The BSDCNN- signal's transition to a binary ZERO at time 7-C means that use of the bus has been granted to a master unit. Thereafter, the second phase of bus operation means the master has been selected and is now free to transfer information on the data, address and control leads of the common bus 107 to a slave unit, that the master so designates.

The slave unit prepares to initiate the third phase of the bus operation beginning at the negative going edge of the strobe signal BSDCND-. The strobe signal is delayed, for example, sixty (60) nanoseconds from the negative going edge of BSDCNN- signal by a delay line 824 of FIG. 8 in the bus priority resolution logic. Upon the occurrence of the negative going edge of BSDCND- signal at time 7-D, the slave unit can now test to see if this is its address and if it is being called to start the decision making processor of what response to generate. Typically, this will cause an acknowledge signal (BSACKR-) to be generated by the slave unit or in the non-typical cases a BSNAKR— or BSWAIT— signal or even no response at all (for the case of a non-existent slave) may be generated as herein described. The negative going edge of the acknowledge signal at time 7-E when received by the master unit, causes the master's BSDCNN— signal to go to a binary ONE at time 7-F. The strobe signal returns to the binary ONE state at time 7-G which is a delay provided by the delay line 824 in FIG. 8 from time 7-F. Thus, in the third phase of the bus operation, the data and address on the bus are stored by the slave unit and the bus cycle will begin to turn off. The ending of the cycle, i.e., when BSDCNN— goes to binary ONE, dynamically enables another priority net resolution.

A bus request signal may, at this time, be generated and if not received this means that the bus will return to the idle state, and accordingly, the BSREQT— signal would go to the binary ONE state. If the bus request signal is present at that time, i.e., a binary ZERO as shown, it will start the asynchronous prioriy net selection process following which another negative going edge of the BSDCNN— signal will be enabled as shown by the dotted lines at times 7-I and 7-J. It should be noted that this priority net resolution need not wait or be triggered by the positive going edge of the acknowledge signal at time 7-H, but may in fact be triggered at a time 7-F just following the transition of the bus to an idle state if thereafter a unit desires a bus cycle. Although the priority net resolution can be triggered at time 7-F by the positive going edge of the BSDCNN— signal, the second negative going edge of the BSDCNN— signal, in response to the setting of a grant flip-flop must await the positive going edge of the acknowledge signal at time 7-H. The negative going edge of the BSDCNN— signal at time 7-I illustrates the case where the priority net resolution is triggered at time 7-F and the resolution occurs before time 7-H. The negative going edge of the BSDCNN— signal at time 7-J illustrates the case where the acknowledge signal clears before the resolution of the priority net. The negative going edge of the BSDCNN— signal at time 7-L illustrates the case where there is no bus request at time 7-F and the priority net resolution is triggered by a later bus request signal BSREQT— at time 7-K. This process repeats in an asynchronous manner.

READ MEMORY OPERATION

A memory read operation will now be discussed by way of example. In the example, an I/O controller will make a read request of memory and the two bus cycles associated with the request and response will be examined. During the first bus cycle, the I/O controller is the master and the memory is the slave. During this first cycle, the I/O controller bids for the bus using its priority network logic and the memory controller responds. During the second bus cycle, in which the memory controller is the master and the central processor is the slave, the master and the I/O controller is the slave, the memory bids for the bus using its priority network logic and the I/O controller responds using bus interface logic. The memory controller busy signal is provided to indicate that one of the memory modules connected to the memory controller is in fact busy. If a memory module is busy, then a WAIT signal will be generated in response to a master (requesting) unit making a memory request. The acknowledge signal (ACK) will be generated when the memory controller is not busy. It is again noted that the WAIT signal means that there will be a very short delay since the memory is still busy.

LOCK MEMORY OPERATION

The other condition which indicates which of the ACK, NAK or WAIT signals is to be generated, is the lock signal which as indicated hereinbefore comprises a multi-cycle bus transfer whereby a device can access a specific memory location without any other locking unit being able to break into the operation. The effect of this lock operation is to extend the busy condition of the memory controller beyond the completion of a single cycle for certain kinds of operations. Devices on the common bus 107 attempting to initiate a lock operation before the last cycle of the sequence is complete will receive a NAK signal. The memory will however, still respond to a memory request as shall be presently explained. It is noted that the intervening time between these bus cycles may be used by other units not involved in the transfer. A lock operation is used primarily where it is desirable for two or more units or devices to share the same resource, such as memory for example. The lock operation, which can include any number of bus cycles and memory cycles, is unlocked by the particular unit or device which has had control of the shared resource. While the shared resource is locked, other units desiring to access the shared resource will be locked out if such other units on the bus present the lock control signal, or if the CPU attempts to do a lock operation. If a lock operation is not attempted, it is possible for the CPU or such other units to gain access to the shared resource such as, for example, to process an urgent request or procedure. Before any unit presenting the lock signal gains access to the shared resource, the shared resource is tested to see whether it is involved in a lock operation and then, if the resource is not involved in a lock operation, the resource can be accessed by the unit attempting the lock operation.

Thus, it can be seen that the lock operation for sharing a resource is one that is effective between those units which issue the appropriate controls, i.e., the lock control signal and may be used for example, in sharing a portion of memory in which a table of information may be stored. Further, if one of the units desires to change information in the shared resource, other units may be locked out so that they do not gain access to only partially changed information, but rather be allowed access only after all such changes have been made. A read-modify-write operation may be involved in such case.

It is noted that the BSSHBC— signal for a lock operation performed via common bus 107, as shall be seen, is used in a somewhat different manner than has been heretofore discussed. During a bus lock operation, the BSSHBC— signal is issued by the unit attempting to share a resource both to gain access to the shared resource by means of a test and lock procedure and to unlock the shared resource when it has completed its lock operation.

LOCK LOGIC

The method by which lock logic 110 of memory controller 109 is utilized to perform an indivisible memory operation on behalf of an I/O controller or the CPU will now be discussed with reference the logic block diagram of FIG. 8 and the timing diagram of FIG. 9. Because memory controller 109 is dual ported in that it provides memory access from an I/O controller via common bus 107 or from the CPU logic 108, lock logic 110 must provide for the synchronization of lock requests which can be asynchronously generated by either an I/O controller or the CPU logic. This synchronization of the asynchronous lock and unlock operations occurs as described below.

Figure 8:
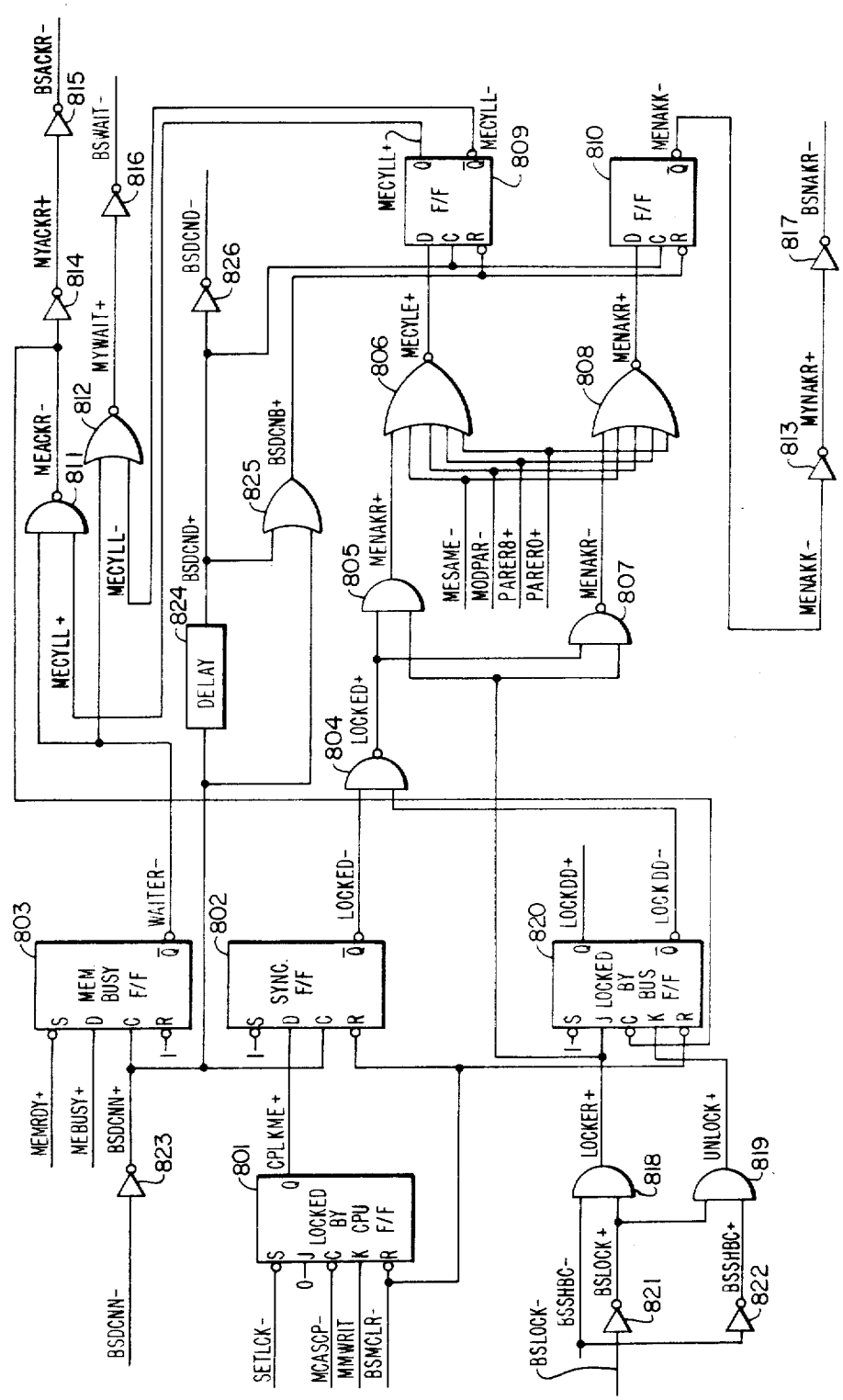
FIG. 8 illustrates a logic diagram of the lock logic of the present invention.

FIG. 8 is a logic block diagram of logic logic 110 of memory controller logic 109. In FIG. 8, the small circles on the inputs or outputs of the logic elements represent inverting inputs and outputs respectively. In FIG. 8, the lock logic 110 is comprised of locked by CPU flip-flop 801, locked by bus flip-flop 820, synchronizing flip-flop 802 and other flip-flops, inverters, AND, NAND and NOR gates. Flip-flops 801 and 820 are J-K negative-edge-triggered flip-flops with preset and clear of the type SN74S112 manufactured by Texas Instruments Inc. of Dallas, Tex. and are described in their book, The TTL Data Book for Design Engineers, Second Edition, copyrighted 1976, which is incorporated herein by reference. Synchronization flip-flop 802 is a D-type positive-edge-triggered flip-flop with preset and clear of the type 74F74 manufactured by Fairchild Camera and Instrument Corporation of Mountainview, Calif., and described in their book, Fast Fairchild Advanced Schottky TTL, copyrighted 1980, which is incorporated herein by reference.

Initially, before any memory lock operation begins, locked by CPU flip-flop 801, locked by bus flip-flop 820, and synchronization flip-flop 802 are in their reset state such that the output signal at their Q output is a binary ZERO and the output at their Q-bar output is a binary ONE. Thus, signal CPLKME+ at the Q output of flip-flop 801 and signal LOCKDD+ at the Q output of flip-flop 820 are binary ZEROs, and signal LOCKDD— at the Q-bar output of flip-flop 820 and signal and LOCKED— at the Q-bar output of flip-flop 802 are binary ONEs. Flip-flops 801, 820 and 802 are initially set to the reset state by a bus master clear signal, BSMCLR—, which is an input to the reset (R) input of each of these flip-flops, transitioning to a binary ZERO for a short period of time when the system is initialized so that logic in units connected to common bus 107 is cleared to an initialized state.

LOCK MEMORY EXAMPLE

The lock logic 110 of FIG. 8 will now be explained with reference to the timing diagram of FIG. 9 which illustrates a case in which an I/O controller wishes to do a lock operation on a location in one of the memory modules. In this example illustrated in FIG. 9, after the I/O controller has initiated the memory locked operation, the CPU determines that it wants to perform a lock operation on the memory and also initiates a lock operation. The example in FIG. 9 shows that the I/O controller lock operation is completed before the CPU lock operation is allowed to take place. During the CPU lock operation, the I/O attempts to initiate another memory lock operation. FIG. 9 shows that the I/O memory lock operation begins at time A and completes a time O, during which a memory read is performed from time A to time J, the data is modified by the I/O controller from time J to L and the modified data is written into the memory from time L to O. Following the bus memory lock operation on behalf of an I/O controller, the CPU completes its memory lock operation, which began at time AA, and during which the CPU has the memory locked from time C to X and which is comprised of the CPU doing a memory read from time BB to CC, the CPU modifying the data from time CC to DD, and the CPU writing the modified data into memory from time DD to EE. During the CPU, which results in a NAK response memory lock operation, an I/O controller attempted to do a memory lock operation from time R to U, which results in a NAK response.

In FIG. 9, at time A and I/O controller, such as I/O controller 103, of FIG. 1 has determined that wishes to perform a read-modify-write operation of a location in memory. This requires that a memory lock operation be performed and at time A the I/O controller requests use of common bus 107 by causing bus request signal BSREQT− to transition from the binary ONE to the binary ZERO state. When the bus request signal BSREQT− transitions to the binary ZERO state, it starts a bus priority resolution cycle and priority logic in each of the units attached to common bus 107 then proceed to determine which of all possible requesting units has the highest priority and, if the I/O controller is the highest priority, it will be granted the bus as the master unit and the I/O controller's priority logic will cause data cycle now signal, BSDCNN−, on the bus to transition from the ONE to the binary ZERO state at time B. At this same time, I/O controller logic 103 as the master unit will put on the bus address lines the address of the location which is to be read and will also set bus lock signal BSLOCK− to the binary ZERO state and leave second half bus cycle, signal BSHHBC−, in the binary ONE state thus signalling the memory as the salve unit that a lock operation is to be performed. Thus, at time B in FIG. 9 we see that signal BSHHBC− is a binary ONE at one input of AND gate 818 of FIG. 8 and signal BSLOCK+ is a binary ONE at the other input of AND gate 818 causing the output thereof, signal LOCKER+, to be a binary ONE at the J input of locked by bus flip-flop 820. Signal BSLOCK+ is output by inverter 821 which inverts input signal BSLOCK+ from common bus 107. Bus lock signal BSLOCK+, which becomes a binary ONE at time B in FIG. 9, is also one input to AND gate 819. The other input to AND gate 819 is bus second half cycle, signal BSSHBC+, which is the inverted output of inverter 822, the input of which is signal BSSHBC− from common bus 107. At time B, signal BSSHBC+ remains a binary ZERO thus disabling the output of AND gate 819 causing signal UNLOCK+ to be a binary ZERO at the K input of locked by bus flip-flop 820. At time B, data cycle now signal BSDCNN− on the bus changes from the binary ONE to the binary ZERO state and causes the output signal BSDCNN+ of inverter 823 to change from the binary ZERO to the binary ONE state and at the clock (C) input of synchronization flip-flop 802 thereby clocking signal CPLKME+ at its data (D) input. Because signal CPLKME+ is a binary ZERO at time B, synchronization flip-flop 820 remains in the reset state causing its Q-bar output, signal LOCKED−, to remain a binary ONE and thus continue to partially enable NAND gate 804.

Thus, as it will become more apparent later, when an I/O controller is attempting to lock memory, the output of AND gate 818, signal LOCKER+, is a binary ONE and the output of AND gate 819, signal UNLOCK+, is a binary ZERO in response to the I/O controller setting signal BSLOCK− to the binary ZERO state and maintaining signal BSSHBC− in the binary ONE state as is done at times B and S in FIG. 9 at the beginning of a I/O memory lock operation. The output of AND gate 818 is a binary ZERO and the output of AND gate 819 is a binary ONE when an I/O controller is attemping to unlock the memory which is done by the I/O controller setting signal BSLOCK− to the binary ZERO state and setting bus second half cycle signal BSSHBC− to the binary ONE state such as is done at time M in FIG. 9. Thus, at time B in FIG. 9, the lock and unlock signals are established at the J and K inputs, respectively, of locked by bus flip-flop 820. Establishing these inputs at the J and K inputs of flip-flop 820 has no effect until flip-flop 820 is clocked by clocking signal MEACKR− transitioning to the binary ZERO state which occurs later at time D. Until time D, locked by bus flip-flop 820 remains in the reset state such that its Q-bar output signal, LOCKDD−, remains in the binary ONE state at the other input of NAND gate 804. With both inputs of NAND gate 804 in the binary ONE state, the output thereof, signal LOCKED+, will remain in the binary ZERO state until one of its inputs becomes a binary ZERO.

Signal LOCKED+ is one of the inputs to AND gate 805 and to NAND gate 807. The other input to AND gate 805 and NAND gate 807 is signal LOCKER+, the output of AND gate 818. The output of NAND gate 804, signal LOCKED+, will be a binary ONE if the memory is already locked by either the CPU or the bus, and a binary ZERO if the memory is not locked by either the CPU or the bus.

Signal LOCKED+, being a binary ZERO at one input of AND gate 805 and an input of NAND gate 807, will disable these gates and cause their outputs, signal MENAKR+ to be a binary ZERO and signal MENAKR+ to be a binary ONE, respectively. Signal MENAKR+ is one input to NOR gate 806 and signal MENAKR− is one input to NOR gate 808. The other inputs to NOR gates 806 and 808 are signals MESAME−, MODPAR−, PARER8+ and PARER0+. In order for the output of NOR gate 806 or NOR gate 808 to be a binary ONE, each of their five inputs must be binary ZEROs. Signal MESAME− is a binary ZERO when the address of the memory location to be read or written is within the address space of the memory controller 109 (i.e., the address memory location must fall within memory module 1 101 or memory module 2 102 and the addressed module must be physically present within the system). Therefore, at time B, if the address presented on the common bus 107 bus by I/O controller 103 as master falls within a memory module which is present, signal MESAME− will be a binary ZERO. Signal MODPAR− is an address modular parity signal which indicates whether the parity on the upper eight bit address lines of the common bus agrees with the parity line on the common bus and, if so, will be a binary ZERO. Parity error signals PARER0+ and PARER8+ are data parity error indicators for the low order 8-bit and high order 8-bit data lines, respectively, and will be binary ZEROs if no parity error occurs. Therefore, in the normal case when an I/O controller is addressing a location within memory, signals MESAME−, MODPAR−, PARER8+ and PARER0+ will all be binary ZEROs and the output of NOR gates 806 and 808 will be determined solely by input signals ME- NAKR+ and MENAKR−, respectively. In this case, at time B, signal MENAKR+ will be a binary ZERO causing the output of NOR gate 806, signal MECYLE+, to be a binary ONE and signal MENAKR− will be a binary ONE and cause the output of NOR gate 808, signal MENAKR+, to be a binary ZERO. D-type flip-flops 809 and 810 are clocked by strobe signal BSDCND+ at their clock (C) inputs transitioning from the binary ZERO to the binary ONE state. Strobe signal BSDCND+ is derived by delaying signal BSDCNN+ about sixty nanoseconds by delay line 824 which is part of the memory controller's bus priority resolution logic. Signal BSDCND− shown in FIG. 7 is derived by inverting signal BSDCND+ by inverter 826. The clocking of the binary ONE signal, MECYLE+, at the D input of flip-flop 809 will result in the setting of flip-flop 809 causing its Q output, signal MECYLL+, to become a binary ONE and its Q-bar output, signal MECYLL−, to become a binary ZERO. At this same time when signal BSDCND+ transitions from the binary ZERO to the binary ONE state, flip-flop 810 will be clocked and the binary ZERO of signal MENAKR+ at its D input will result in flip-flop 810 remaining in the reset state which will cause its Q-bar output, signal MENAKK−, to remain in the binary ONE state. The clocking of flip-flops 809 and 810 takes place at time D when signal BSDCND+ transitions from the binary ZERO to the binary ONE state. The outputs of flip-flop 809, signal MECYLL+ and MECYLL−, are used to determine whether a positive acknowledgement (ACK) or a wait (WAIT) response will be generated by the memory as the slave unit to the request from the master unit via the bus. The output of flip-flop 810, signal MENAKK−, is used to determine whether a negative (NAK) response will be generated to the requesting unit.

At time D, after flip-flop 809 is set, signal MECYLL+ will become a binary ONE and partially enable NAND gate 811. Also at time D, signal MECYLL− will be a binary ZERO at one input of NOR gate 812 and, therefore, its output signal, MYWAIT+, will be determined by its other input signal, WAITER−. Signal WAITER− is output by memory busy flip-flop 803 which is used to indicate whether the memory is currently busy or not. Signal WAITER− is also the other input to NAND gate 811. Therefore, at time D, if memory busy flip-flop 803 is not set indicating that the memory is not currently busy, signal WAITER− will be a binary ONE at its Q-bar output and partially enable NAND gae 811 and cause its output, signal MEACKR−, to be a binary ZERO when signal MECYLL+ becomes a binary ONE at time D. Signal MEACKR− is inverted by inverter 814 to produce signal MYACKR+ which is in turn inverted by inverter 815 to produce signal BSACKR− which is the positive bus acknowledgement signal which becomes a binary ZERO at time D in FIG. 9. It should be noted that for purposes of simplicity, the propagation delays associated with the elements in FIG. 8 as ignored in the timing diagram of FIG. 9 in many cases. For example, the transition of signal BSDCNN− to a binary ZERO at time D is shown as immediately resulting in signal BSACKR− becoming a binary ZERO in FIG. 9 and ignores the propagation delays of elements 823, 809, 811, 814 and 815. With signal WAITER− being a binary ONE at one input of NOR gate 812, the transission of signal MECYLL− from the binary ONE to the binary ZERO state at time D will not make any difference in the output of NOR gate 812 such that signal MYWAIT+ will remain a binary ZERO and the bus wait signal, BSWAIT−, which is output by inverter 816 will remain a binary ONE.

Thus, it can be seen that at time D in FIG. 9, if an I/O controller attempts to lock the memory and the memory has not been previously locked by either an I/O controller or the CPU and the memory is not busy, the positive acknowledgement (ACK) will be generated by the slave unit's lock logic 110 and sent to the I/O controller as the master unit via common bus 107 at time D. Returning now to flip-flop 810, at time D, when the binary ZERO of signal MENAKR+ is clocked into flip-flop 810, flip-flop 810 will remain reset and its Q-bar output, signal MENAKK−, will remain a binary ONE causing the output of inverter 813, signal MYNAKR+ to remain a binary ZERO and which in turn is inverted by inverter 817 to produce bus signal BSNAKR− which will remain a binary ONE thereby indicating that a negative response (NAK) is not generated to the requesting I/O controller which is performing a lock operation.

The transition of signal MEACKR− from the binary ONE to the binary ZERO state at time D at the clock (C) input of locked by bus flip-flop 820 clocks the binary ONE of signal LOCKER+ at the J input and thereby sets flip-flop 820 causing signal LOCKDD+ to become a binary ONE and signal LOCKDD− to become a binary ZERO. Thus, locked by bus flip-flop 820 is clocked each time a requesting unit attached to common bus 107 receives a positive acknowledgement (ACK) from memory controller 109. The transition of signal LOCKDD− from the binary ONE to the binary ZERO state at time D will cause the output of NAND gate 804, signal LOCKED+, to become a binary ONE at time F.

At time D, when the memory controller has determined that the memory request from the I/O controller will be given a positive acknowledgement, the memory controller latches in the memory address into the bus port of the dual ported memory and, in addition, latches in the state of the bus line which indicates whether the memory read or write operation is to be performed and makes a request of the priority resolver logic 111 for a memory cycle to be performed on behalf of a unit attached to the bus. At time E, after the master unit, which in our example is I/O controller 103, has received the ACK from memory controller 109, the I/O controller removes the bus lock and data cycle now signals, BSLOCK− and BSDCNN−, and returning them from the binary ZERO to the binary ONE state and, in addition, the I/O controller removes the memory address and the read or write memory indicating signals. The transition of the data cycle now signal, BSDCNN−, from the binary ZERO to the binary ONE at time E thereafter causes the I/O controller to reset the bus request signal such that signal BSREQT− transitions from the binary ZERO to the binary ONE state at time E. At time F, both flip-flops 809 and 810 are reset by signal BSDCNB+ becoming a binary ZERO at their reset (R) inputs. Signal BSDCNB+ is output by OR gate 825 which has inputs of signal BSDCND+ and signal BSDCNN+. The resetting of flip-flops 809 and 810 at the end of the memory bus cycle results in the ACK, WAIT or NAK signal, whichever was active, being reset and returning to the binary ONE state as does signal BSACKR− at time F, FIG. 9. Thus, at time F, the slave unit removes its positive, wait, or negative response signal from the bus in preparation for the next bus cycle.

Later at time G, when the requested data has been read from the memory, the memory controller 109 makes a request for use of the bus at time G by causing the bus request signal BSREQT— to transition from the binary ONE to the binary ZERO state. After the priority resolution has been determined, signal BSDCNN— transitions from the binary ONE to the binary ZERO state at time H and, assuming that the memory has won the bus, the memory as the master unit then places on the bus data lines the word of data read from the memory. It also, at this time, causes bus second half cycle, signal BSSHBC—, to transition from the binary ONE to the binary ZERO state thereby indicating to the slave unit that this is a response cycle to the previous request. When the I/O controller, as slave, recognizes its controller address on the common bus 107, its responds by generating a positive acknowledgement and changes signal BSACKR— from the binary ONE to the binary ZERO state at time I.

The receipt of the ACK by the memory causes the memory controller's priority network logic to cause the data cycle now signal, BSDCNN—, to transition from the binary ZERO to the binary ONE state at time J and also causes the memory to remove the bus second half cycle signal, BSSHBC—, such that it returns from the binary ZERO to the binary ONE state at time J. The receipt of the positive acknowledgement and the change of the data cycle now signal from the binary ZERO to the binary ONE state causes the bus request signal from the memory controller, signal BSREQT—, to transition from the binary ZERO to the binary ONE state at time J. At time K, after delaying the data cycle now signal BSDDNN— within its priority network logic, the I/O controller which had responded with an acknowledgement as a slave unit, resets the bus acknowledgement signal, BSACKR—, from the binary ZERO to the binary ONE state at time K.

At this point in time in the lock operation example, the I/O memory request has been completed in that from time A through F the I/O controller was the master and the memory responds as the slave and took the memory address from the bus and from time G through K, the memory became the master and responded to the I/O controller as slave and provided the word of data read from the memory. Between time E and G, other units on the common bus 107 could request and receive access to the bus and could also receive access to memory controller if they are not attempting to do a lock operation. Also during this time, the CPU, if it had not requested a lock operation at time C, could have access to the memory when the memory was not being used in response to bus requests which are a higher priority as determined by the priority resolver logic 111. From time J through to L, the I/O controller performed operations to modify the data read from memory. At time L, the I/O controller wanted to write back into memory the modified data and requests use of the bus by setting the bus request line BSREQT— from the binary ONE to the binary ZERO state. After the I/O controller wins the bus as master, it causes the data cycle now signal, BSDCNN—, to transition from the binary ONE to the binary ZERO O at time M and, in addition, puts the address of the location in memory to be written onto the bus address lines and the data in memory to be written into that location onto the bus data lines. At time M, the I/O controller also indicates that this is the completion of the lock operation and to do this it unlocks the memory by causing signal BSLOCK— to transition from the binary ONE to the binary ZERO state and by causing the second half bus cycle line, BSSHBC—, to transition from the binary ONE to the binary ZERO state thereby indicating that this operation is an unlock operation as opposed to the lock operation which occurred at time B, during which the signal BSSHBC— was held at the binary ONE state.

Returning now to the lock logic 110, illustrated in FIG. 8, it will be appreciated that at time M during the memory write bus cycle, in which an I/O controller as the master unit has indicated that the memory is to be unlocked by setting signal BSLOCK— and signal BSSHBC— to the binary ZERO state, the output of AND gate 818, signal LOCKER+ will be a binary ZERO indicating that this is not a lock operation and the output of AND gate 819, signal UNLOCK+, will be a binary ONE indicating that this is an unlock operation. At this time M, locked by bus flip-flop 820, remains in the set state causing its Q-bar output, signal LOCKDD—, to remain in the binary ZERO state. The binary ZERO of signal LOCKDD— disables NAND gate 804 causing its output, signal LOCKED+, to be a binary ONE thereby indicating that memory is currently locked. The binary ONE of signal LOCKED+ partially enables AND gate 805 and NAND gate 807. However, both of these gates are disabled by the binary ZERO of signal LOCKER+ thus making the output of NAND gate 805, signal MENAKR+, a binary ZERO and the output of NAND gate 807, signal MENAKR—, a binary ONE. Assuming that the other four signals that are inputs to NOR gates 806 and 808 are in the binary ZERO state indicating that the memory address on the bus is to a memory location controlled by the memory controller and that there is no address parity or data parity error, the output of NOR gate 806, signal MECYLE+, will be a binary ONE and the output of NOR gate 808, signal MENAKR+ will be a binary ZERO because its input signal MENAKR— is a binary ONE. Thereafter, after signal BSDCNN+ has been delayed by delay line 824 and causes clocking signal BSDCND+ to transition from the binary ZERO to the binary ONE state clocking flip-flops 809 and 810, flip-flop 809 will be set and cause its Q-output signal MECYLL+ to become a binary ONE and flip-flop 810 will remain reset and cause its Q-bar signal, MEANKK—, to remain a binary ONE.

Assuming that the memory is now available, such that the output of memory busy flip-flop 803, signal WAITER—, is a binary ONE, NAND gate 811 will be fully enabled and cause its output signal, MEACKR—, to become a binary ONE, which in turn will be inverted by inverters 814 and 815 and cause bus acknowledgement signal BSACKR— to become a binary ZERO at time N in FIG. 9. At time N in FIG. 9, bus wait signal and bus NAK signal, BSWAIT— and BSNAKR—, will remain in the binary ONE state. When signal MEACKR— transitions from the binary ONE to the binary ZERO state at time N, it will clock locked by bus flip-flop 820 which will have a binary ZERO at its J input and a binary ONE at its K input thus resulting in the resetting of flip-flop 820 which will cause its Q output signal, LOCKDD+, to transition from the binary ONE to the binary ZERO state.

As discussed earlier, the receipt of the acknowledgement signal by the slave unit, which is the I/O controller in this case, will cause the I/O controller to remove the bus lock and bus second half bus cycle and the write address and data from the common bus 107 at time O and thereby make signals BSDCNN—, BSLOCK—, and BSSHBC— transition from the binary ZERO to the binary ONE state. Receipt of the ACK and the transition of the data cycle now signal, BSDCNN—, will also result in the I/O controller releasing the bus request line such that signal BSREQT— transitions from the binary ZERO to the binary ONE state at time O. After delaying signal BSDCNN+ in the priority resolution logic delay time 824 of the memory controller, the output of OR gate 824, signal BSDCNB+, at the reset (R) inputs of flip-flops 809 and 810 transitions from the binary ONE to the binary ZERO thus resetting both flip-flops and causing the bus acknowledgement signal, BSACKR—, to transition from the binary ONE to the binary ZERO state at time P.

The return of the acknowledgement signal BSACKR— at time P to the binary ONE state completes the I/O memory write cycle and completes the total read-modify-write cycle in which the memory was initially locked at the start of the read cycle at time D when the locked by bus flip-flop 820 was set and ends at the end of the write cycle at time N when the locked by bus flip-flop 820 was reset.

As can be appreciated from the above discussion of the lock logic 110 in FIG. 8, each time the lock logic generates an ACK to a master unit which is requesting use of the bus, locked by bus flip-flop 820 is clocked by signal MEACKR— transitioning from the binary ONE to the binary ZERO state such as at times D, I and N in FIG. 9. At time D, the locked by bus flip-flop 820 was set and at time N, it was reset. At time I, the clocking of flip-flop 820 did not result in any change of state of the flip-flop because the J and K inputs were in the binary ZERO state because AND gates 818 and 819 were disabled by the binary ZERO state of lock signal BSLOCK+.

It should be noted that flip-flops 809 and 810 only generate an ACK, WAIT or NAK signal on the bus when the master unit has addressed a location within memory and will not be generated when a master unit is addressing another I/O controller or a location that is not within the memory controlled by memory controller 109. This occurs even though signal BSDCND+ clocks flip-flops 809 and 810 during each bus cycle. However, unless the address lines on the common bus 107 indicate a memory location within the memory, signal MESAME—, which is an input to both NOR gates 806 and 808 will be in the binary ONE state thereby causing their outputs, signals MECYLE+ and MENAKR+, respectively, which are the inputs to the data (D) inputs of the flip-flops to be in the binary ZERO state and thereby result in flip-flops 809 and 810 always being reset whenever they are clocked by signal BSDCND+. This resetting in turn results in no change of state of their Q and Q-bar outputs, which in turn will result in no bus ACK, WAIT or NAK signal being changed to the binary ZERO state.

Besides being used to generate an ACK response, signal MEACKR— output by NAND gate 811 is also used as an I/O memory request into the priority resolver logic 111 such that each time the memory gives a positive acknowledgement (ACK) to a memory request coming from common bus 107, it makes a request for the memory through priority resolver logic 111.

J-K flip-flops are set by clocking a binary ONE into the J input and are reset by clocking a binary ONE to the K input. Therefore, the clocking of locked by bus flip-flop 820, each time the memory controller as a slave unit on the bus, responds with an ACK to the master unit requesting a memory location be written into or read from. The locked by bus flip-flop 820 will only change state if it is being locked or if it being unlocked as specified by the combination of the BSLOCK— and BSSHBC— signals such as happens at time B and time M in FIG. 9 and does not occur at time H in FIG. 9 because signal BSLOCK— is a binary ONE.

Before discussing the method by which the memory is locked by the CPU, it should be noted that a normal (i.e., non-lock) memory read or write operation can take place on behalf of an I/O controller attached to common bus 107 during the time that the memory is locked. That is, the only thing that is inhibited during the time that the memory is locked is another locked read or write operation, be it from the CPU or bus. For example, if an I/O controller requested a memory read, the sequence shown in FIG. 9 starting at time A through time J would take place with the exception that the master unit would not cause the bus lock signal BSLOCK— to go to the binary ZERO state at time B and therefore signal LOCKER+, at the J input of flip-flop 820, would be a binary ZERO and it would also be a binary ZERO at the input of AND gate 805, which would cause the output thereof, signal MENAKR+, to be a binary ZERO which would result in the output of NOR gate 806, signal MECYLE+, being a binary ONE. When the binary ONE of signal MECYLE+ was clocked into flip-flop 809 by the transition of signal BSDCND+ to the binary ONE state, NAND gate 811 would be fully enabled, assuming signal WAITER— is a binary ONE, and result in an ACK from the memory as the slave unit to the I/O controller as the master unit. This ACKing of the master unit would result in the clocking of locked by bus flip-flop 802, but because a binary ZERO appears at both the J and K inputs thereof, the state of flip-flop 820 would not change and its previous unlocked state would remain unchanged.

CPU LOCK MEMORY OPERATION

The portion of lock logic 110 which allows the CPU to perform a memory lock operation will now be discussed with reference to FIGS. 8, 9 and 10. When the CPU wishes to read or write into the memory, whether it be during a non-locked or locked operation, the CPU does not communicate to the memory via common bus 107 but instead uses the second port of the memory controller 109. Therefore, the CPU does not make requests to use common bus 107 by changing the state of the bus request line BSREQT—, nor does the CPU use any of the timing signals or the lock signals such as data cycle now signal BSDCNN— or the lock signal BSLOCK— or the second half bus cycle signal BSSHBC—. In addition, the CPU does not look at the ACK, WAIT or NAK signal lines to see whether the memory as a slave unit has accepted the command from the master unit which wants to access the memory.

This master-slave unit relationship does not exist between the CPU and the memory because the CPU communicates directly to the memory through its own port. The CPU locks the memory whenever it wants to do a locked operation by setting locked by CPU flip-flop 801, which as described above, is a J-K flip-flop. In the preferred embodiment, the CPU is a microprogrammed system and during the time that it is executing a software instruction that requires a memory lock operation, such as when the CPU is executing a decrement instruction which requires that: the memory location be read into a CPU register, a one subtracted from the contents of the register, and then the register contents written back into the memory. The CPU sets flip-flop 801 by performing a microoperation which causes signal SETLCK— at the set (S) flip-flop 801 to transition from the binary ONE to the binary ZERO state. The setting of flip-flop 801 causes its Q output, signal CPLKME+, to transition from the binary ZERO to the binary ONE state. An example of this is shown at time C in FIG. 9, which has occurred slightly after the memory has already been locked by a memory request which occurred from the bus at time B. As will be appreciated later, because of the asynchronous operation of the execution of the CPU microoperations with respect to bus cycles on the common bus 107, a race condition can occur between the bus attempting to lock the memory at the same time the CPU is attempting to lock the memory. Before describing the possible race between the CPU and the bus to lock the memory, the method by which the CPU locks the memory will be described.

As described above, locked by CPU flip-flop 801 is initialized to the reset state by bus master clear signal BSMCLR—, when the CPU is initialized, as is synchronization flip-flop 802 and locked by bus flip-flop 820. Thereafter, during the execution of the software by the CPU, when a software instruction requires that a lock operation be performed on a memory because the CPU wants to read a location, modify the contents and write it back without being interrupted, the microinstructions executing the software instruction perform a set lock operation by generating signal SETLCK— to the binary ZERO state at the set (S) input of flip-flop 801. This lock memory microoperation is indicated in FIG. 10 as block 1001. It should be noted that the setting of locked by CPU flip-flop 801 takes place unilaterally by the CPU without the CPU examining the status of the locked by bus flip-flop 820 to determine whether the memory has already been locked by the bus. Further, the CPU need not determine whether the memory has already been locked by the CPU by examining the status of locked by CPU flip-flop 801 because the CPU implicitly knows that the microinstruction sequence that locks and then unlocks the memory is not interruptable such that if the memory had been previously locked by a CPU microoperation, it would have been followed by an unlock microoperation and, therefore, if the CPU is now in a position to lock the memory, the status of locked by CPU flip-flop 820 must be such that it is in a reset state and that the memory is not currently locked by the CPU.

Synchronization flip-flop 802 is necessary because of the asynchronous nature of the bus signals with respect to the execution of the CPU microinstructions. Therefore, by clocking in the output of locked by CPU flip-flop 801, signal CPLKME+, at the data (D) input of flip-flop 802 by use of the bus data cycle now signal BSDCNN+, which is derived by inverting bus signal BSDCNN— by inverter 823, the Q-bar output of flip-flop 802, signal LOCKED—, will be stabilized and thereby insure that the signals at the data (D) inputs of flip-flops 809 and 810 will be in a stable state when they are clocked approximately 60 nanoseconds later by signals BSDCND+ transitioning to the binary ONE state. Therefore, synchronization flip-flop 802 ensures that if the CPU locks the memory before the occurrence of the data cycle now signal BSDCNN— on the bus going to the binary ZERO state, the locked by CPU signal will be visible and stabilized such that it will affect the status and the MECYLE+ and MENAKR+ signals at the inputs of flip-flops 809 and 810 and result in the NAKing of a request from the bus to perform a locked memory operation. However, if the CPU does not set the locked by CPU flip-flop 801 before the occurrence of the data cycle now signal on the bus, the synchronization flip-flop 802 will remain in the reset state and the inputs to flip-flop 809 and 810 will not be affected until the next bus cycle. By clocking flip-flops 809 and 810 60 nanoseconds after clocking synchronization flip-flop 802, there is provided sufficient time to ensure that the Q-bar output of flip-flop 802 has reached a steady state, which may take from 20 to 30 nanoseconds, and that output has had sufficient time to propagate through NAND gate 804, AND gate 805, NOR gate 806, or through NAND gate 804, NAND gate 807 and NOR gate 808 prior to the clocking of flip-flops 809 and 810. Once the CPU has set locked by CPU flip-flop 801 and its output has been clocked into synchronization flip-flop 802 by the occurrence of data cycle now on the bus, the binary ZERO state of signal LOCKED— will cause the output of NAND gate 804 to become a binary ONE and stay in that state until such time as both synchronization flip-flop 802 and locked by bus flip-flop 820 are reset. Thus, the output of NAND gate 804, signal LOCKED+, when a binary ONE indicates that the memory has been locked by either the CPU or the bus or both.

The use of the LOCKED+ signal by the rest of the lock logic 110 is the same as has been discussed above with respect to locking the memory from the bus. Locking the memory by the CPU does not result in the generation of an ACK, WAIT or a NAK response to the CPU, however, because these signals are only generated in response to a master unit requesting use of the memory over common bus 107. No bus cycle is involved with the CPU's use of memory, therefore the locking of the memory by the CPU will not result in the generation of a response from the memory as slave to the master unit, whereas a response is generated when the memory is locked by the bus because the locking of the bus takes place as part of a bus cycle. Therefore, the setting of locked by CPU flip-flop 801 is done in preparation for a subsequent bus memory cycle so that any I/O device acting as a master in attempting to perform a locked operation on the memory via the bus will receive the correct response, whether the memory was locked by an I/O device on the bus or by the CPU.

As discussed above, locked by CPU flip-flop 801 is set by the CPU executing a microoperation which causes signal SETLCK— to become a binary ZERO. The CPU executes this set lock microoperation when it is performing a lock operation which requires a read-modify-write of a memory location. During each memory access, for either a read or write, and whether the access is being performed on behalf of the CPU or an I/O device connected to the common bus, a timing signal MCASCP— becomes a binary ZERO when the column address is presented to the semiconductor chips which make up the main memory. Therefore, during each memory access, locked by CPU flip-flop 801 will be clocked by signal MCASCP— becoming a binary ZERO at the clock (C) input. During a memory write, which is being performed on behalf of the CPU, and not on behalf of an I/O controller on the common bus, signal MMWRIT+ is a binary ONE at the time that column address signal MCASCP— becomes a binary ZERO. Therefore, by inputting CPU memory write signal MMWRIT+ into the K input of flip-flop 801, the locked by CPU flip-flop will be reset each time a memory write is performed on behalf of the CPU. Therefore, it can be appreciated that locked by CPU flip-flop 801 is set by the execution of a CPU microinstruction in anticipation of performing a read-modify-write operation and the flip-flop is unconditionally reset whenever a memory write is done on behalf of the CPU. This simplification of the lock logic 110 is possible because it is implicit that the only time that the CPU locks the memory is in preparation of doing a read-modify-write operation and, therefore, the logic can unconditionally reset the locked by CPU flip-flop at the end of any CPU write operation because it will be the final act of the read-modify-write sequence which could have asked for the memory to be locked.

Memory busy flip-flop 803 was described earlier with respect to its output signal WAITER—. When memory busy flip-flop 803 is set, its Q-bar output, signal WAITER—, will be a binary ZERO to indicate that the bus memory port of the dual ported memory is busy performing a memory operation on behalf of a device connected to common bus 107. Thus, the setting of memory busy flip-flop 803 prevents a subsequent memory request from the bus to be positively acknowledged until the current memory request is completed. As seen in the above discussion, when memory busy flip-flop 803 is set, the binary ZERO of signal WAITER— will disable NAND gate 811 and prevent and ACK from being generated to the master unit requesting access to memory and instead will result in the enabling of NOR gate 812 which will result in a WAIT signal being generated by the memory in response to a request from an I/O controller for access to the memory.

When the system is initialized, signal MEMRDY— is set to the binary ZERO state and thereby setting flip-flop 803 and holding it set until such time as the system has been powered up and the memory is up to speed and has been cleared out. Thereafter, signal MEMRDY+ returns to a binary ONE and memory busy flip-flop 803 will be set during a bus cycle if the data (D) signal MEBUSY+ is a binary ONE when the data cycle now signal BSDCNN+ becomes a binary ONE at the clock (C) input. Signal MEBUSY+ results from the accumulation of a collection of memory signals associated with the bus port of the dual ported memory, the result of which is that signal MEBUSY+ will be in the binary ONE state whenever the bus port of the dual ported memory is engaged in a memory operation and is not free to accept a memory request from the common bus 107. When the memory has completed the memory operation on behalf of a device connected to common bus 107, signal MEBUSY+ returns to the binary ZERO state and the next time the memory bus flip-flop 803 is clocked by bus data cycle now signal BSDCNN+, memory busy flip-flop 803 will be reset. This resetting occurs early enough in the bus cycle such that memory busy flip-flop 803 will be reset prior to the generation of the ACK or WAIT signal of a bus cycle in which a request for memory from an I/O controller takes place.

The above discussion has indicated how the bus can lock the memory by setting locked by bus flip-flip 820 and how the CPU can lock the memory by setting locked by CPU flip-flop 801. The method by which the locked by bus flip-flop 820 is reset has been discussed as has been the method by which the locked by CPU flip-flop 801 is unconditionally reset whenever a memory write operation performed on behalf of the CPU. It has also been discussed as to how a subsequent lock operation from the bus is given a negative acknowledgement (NAK) if an attempt is made to perform a lock operation during the time in which the memory is already locked by either the CPU or the bus. The method by which the CPU determines whether the memory has been locked by the bus when the CPU attempts to perform a locked operation will now be discussed.

Because the CPU does not see the ACK, WAIT or NAK signals which are generated only when the memory is responding to a memory request originated from the bus, the CPU looks directly at the outputs of the locked by bus flip-flop 820 by examining the Q output signal LOCKDD+. Basically, what the CPU does is to unconditionally set locked by CPU flip-flop 801 via a firmware microoperation and then by another firmware microoperation looks at the status of the locked by bus flip-flop 820 and loops until the memory is not locked by the bus. The CPU then performs its read-modify-write operation with the memory write by the CPU resetting the locked by CPU flip-flop 801. This sequence is illustrated in FIG. 10 which shows four blocks, each block corresponding to a single microoperation of the CPU firmware. These four blocks, 1000 through 1004, represent microoperations which may be part of a software instruction which performs a memory lock operation such as discussed earlier, for example, a decrement word operation in which a word is read from memory, the word is decremented by one, and the decremented value is written back into the memory.

In block 1001, the CPU firmware unconditionally sets locked by CPU flip-flop 801. This microoperation may be followed immediately by the microoperation represented by block 1002 or there can be intervening microoperations as shown by the broken line running from block 1001 to block 1002. In block 1002, a microoperation is performed which reads the contents of the memory location which is to be operated on and within the same microoperation, a test is made to see whether locked by bus flip-flop 820 is set. If the signal LOCKDD+ is a binary ONE, indicating that the memory has been locked by the bus, the microoperation branches back to the beginning such that block 1002 will be re-executed and the location will again be read from memory and locked by bus flip-flop 820 retested. This looping within block 1002 will continue until such time as the locked by bus flip-flop 820 is reset at which time the microoperation 1002 will not branch back and the microoperation of block 1003 will be executed. Block 1003 may in fact be several microoperations which compute the new value of the word which was read from memory so an updated value can be subsequently written into memory. Again, there may be intervening microoperations between blocks 1002 and 1003 and between blocks 1003 and 1004 as indicated by the broken line. In block 1004, the updated value is written into memory and because each memory write operation unconditionally resets locked by CPU flip-flop 801, the memory is unlocked by the CPU. As discussed above, during the time that the CPU has locked the memory in block 1001 until it has been unlocked in block 1004, any attempt by a unit on common bus 107 to unlock the memory will result in a NAK being generated by lock logic 110 when the memory responds as the slave unit to the I/O controller which was making the request as a master unit.

Returning now to FIG. 9, it can be seen that the CPU performs a CPU memory lock operation beginning at time AA and ending at time EE. From time AA to time BB, and CPU is executing the memory lock operation of block 1001 of FIG. 10 which results at time C in the setting of the locked by CPU flip-flop 801 which causes the Q output thereof, signal CPLKME+, to become a binary ONE. From time BB through time CC, the CPU firmware is engaged in a loop in which the CPU firmware reads the memory whenever the memory becomes available to the CPU as determined by priority resolver logic 111 and at the same time tests locked by bus flip-flop 820 and continues to re-execute the block 1002 until such time during the last execution of the block, it finds that the signal LOCKDD+ has returned to the binary ZERO state at time N. From time CC through time DD, the CPU executes the microinstructions between blocks 1002 and 1004 including block 1003 which modifies the data to be written into the memory. During time DD through time EE, the CPU executes block 1004 and writes the data back into the memory. The writing of the data into memory by the CPU results in the resetting of locked by CPU flip-flop 801 which causes signal CPLMKE+ to transition from the binary ONE to the binary ZERO state at time X. After time X, any subsequent requests for use of the bus, such as at time Y in FIG. 9, will result in the data cycle now signal BSDCNN— transitioning from the binary ONE to the binary ZERO state such as at time Z, which will in turn result in the resetting of synchronization flip-flop 802 which will cause the output of NAND gate 804, signal LOCKED+, to transition from the binary ONE to the binary ZERO state such as at time Z.

Also shown in FIG. 9 is an attempt by an I/O controller to perform a locked memory operation during the time in which only the CPU has the memory locked. Thus, at time R, the I/O controller, as a master unit, makes a request for the bus which causes the data cycle now signal BSDCNN— to transition from the binary ONE to the binary ZERO state and results in the I/O controller putting the memory address to be read onto the bus and also causes it to set the locked signal BSLOCK— to the binary ZERO state at time S to indicate that a locked operation is desired. Because the bus is at this time locked by the CPU, as indicated by the fact that the output of NAND gate 804, signal LOCKED+, is in the binary ONE state, the output of NAND gate 807, signal MENAKR— will be a binary ZERO and cause the output of NOR gate 808 to be a binary ONE which will result in the setting of flip-flop 810 at time T, which in turn will result in the generating of a NAK onto the bus and cause signal BSNACKR— to transition from the binary ONE to the binary ZERO state at time T. When the negative acknowledgement is received from the memory as the slave unit by the I/O controller as the master unit at time U, the I/O controller will remove the bus lock signal and the data cycle now signal and the bus request signals from the bus such that at time U, signals BSLOCK—, BSDCNN— and BSREQT— will transition from the binary ZERO to the binary ONE state. At time W, when flip-flop 810 is reset by signal BSDCNB+ transitioning to the binary ZERO state at its reset (R) input, flip-flop 810 will be reset and cause signal BSNACKR— to transition from the binary ZERO to the binary ONE state.

Although this attempted I/O memory lock operation is indicated after the completion of the previous I/O memory lock operation, any attempt by another I/O controller to perform a memory lock operation during the time that the memory is locked on behalf of the bus will result in the same sequence occurring with the I/O controller attempting to do the lock operation receiving a NAK from the memory. This is so because the output of NAND gate 804 indicates that the memory is locked on behalf of the CPU or the bus, or both, all of which will result in a NAK being generated in response to any subsequent attempts to initiate a locked operation on behalf of a device connected to common bus 107.

Because of a possible race condition which can result in which both the CPU and the bus are attempting to more or less simultaneously lock the memory, there is a constraint as to the minimum time which must elapse between when the CPU microinstruction which sets the locked by CPU flip-flop 801 is executed and the microinstruction which looks at the output of locked by bus flip-flop 820. There are two cases of interest in this more or less simultaneously attempting to lock the memory: the first case in which the CPU locks the memory just slightly before the bus locks the memory, and the second case in which the CPU locks the memory just slightly after the bus locks the memory. The second case imposes this time constraint as to the minimum time that must elapse between when the CPU sets the locked by CPU flip-flop 801 and when it looks at the output of locked by bus flip-flop 820.

Figure 10:
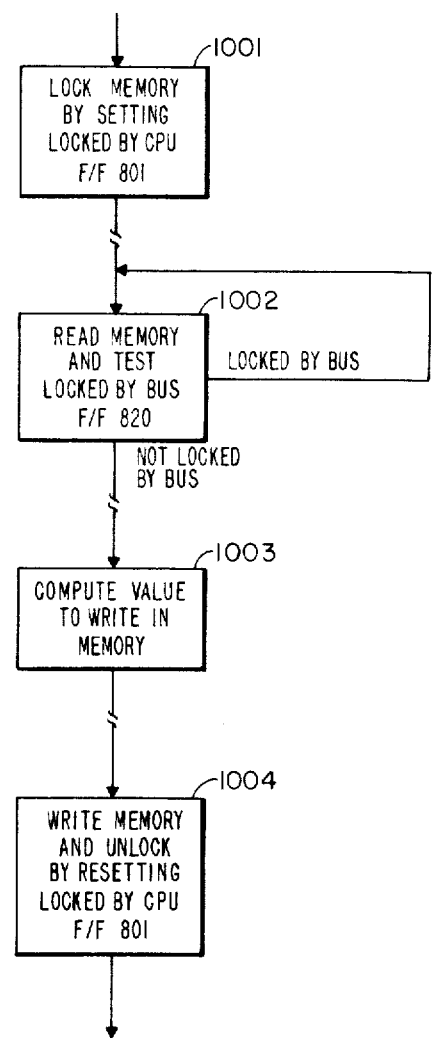
FIG. 10 illustrates a block diagram of the microoperations performed by the CPU of the data processing system of FIG. 1 when performing a lock memory operation using the lock logic of FIG. 8.

During the first case, if the CPU just sets the locked by CPU flip-flop 801 by executing the microoperation of block 1001 of FIG. 10 slightly before an I/O controller on the bus makes a memory lock operation request of the memory, the locked by CPU flip-flop 801 will be set before signal BSDCNN— from the bus indicating data cycle now clocks synchronization flip-flop 802. In this case, the beginning of the bus cycle associated with the bus attempting to lock the memory will result in the setting of synchronization flip-flop 802 which in turn will result in its output signal, LOCKED—, becoming a binary ZERO. Signal LOCKED— being a binary ZERO will result in the output of NAND gate 804 becoming a binary ONE and which in turn will result in a negative acknowledgement (NAK) being generated in response to the lock request and from the bus. Locked flip-flop 820 will not be clocked because a NAK was generated instead of an ACK and therefore the bus will not lock the memory and the memory cannot be locked by the CPU until the CPU completes its total memory lock operation (i.e., a read-modify-write into the memory). In this case in which the CPU locks the memory slightly ahead of the lock request from the bus, there is no constraint with respect to the elasped time between the execution of microinstruction 1001 which sets the locked by CPU flip-flop and the execution of the microoperation associated with block 1002 which looks at the status of the locked by bus flip-flop 820.

The second case in which the race between the CPU and the bus for locking the memory occurs when the bus makes the lock request slightly ahead of when the CPU locks the memory by setting locked by CPU flip-flop 801. This case is illustrated in FIG. 9 in which an I/O controller has made a request to lock the memory at time A, the data cycle now signal BSDCNN— is generated by the I/O controller at time B which is slightly ahead of the time that the microoperation associated with block 1001 in FIG. 10 is executed and which sets the signal SETLCK— to the binary ZERO state such that locked by CPU flip-flop 801 is set at time C resulting in signal CPLMKE+ becoming a binary ONE. In this case, the binary ONE that becomes available at the data (D) input of synchronization flip-flop 802 just missed getting clocked into flip-flop 802 such that its Q-bar output signal LOCKED—, remains a binary ONE. Because at time C, locked by bus flip-flop 820 wll not yet have been clocked by the ACK which will be generated to the I/O controller, the other signal into NAND gate 804, signal LOCKDD—, will also be a binary ONE therefore fully enabling NAND gate 804. Therefore, at time C, the memory has not been locked by the bus and the synchronization flip-flop has not been set resulting in the output of NOR gate 806 being a binary ONE which will cause the setting of flip-flop 809, which in turn will result in the generation of an ACK to the I/O controller which is requesting the lock operation be performed. The generation of the ACK signal will in turn clock locked by bus flip-flop 820 resulting in its being set so that its Q output signals, LOCKDD+ will change to the binary ONE state at time D.

In this second case in which the bus has won the race to lock the memory, if the time between when the CPU sets locked by CPU flip-flop 801 and when it looks at the output of locked by bus flip-flop 820 is too short, the locked by bus flip-flop 820 may not yet have been set by the clocking ACK signal. Therefore, the CPU microoperation that examines the state of locked by bus flip-flop 820 associated with block 1002 cannot occur any sooner after the setting of locked by CPU flip-flop 801 than it takes for the output of locked by bus flip-flop 820 to become stable so that the setting of locked by bus flip-flop 820 wll be visible to the microoperation of block 1002 in FIG. 10. In the preferred embodiment, this minimum time is approximately 60 nanoseconds because the clocking signal BSDCND+ at the clock inputs of flip-flops 809 and 810 occurs approximately 60 nanoseconds after the clocking signal BSDCNN+ of synchronization flip-flop 802. The 60 nanosecond time ignores the propagation delays associated with NAND gate 811 and the settling time of locked by bus flip-flop 820. Therefore, as long as the CPU firmware does not look at the output of locked by bus flip-flop 820 sooner than 60 nanoseconds after setting locked by CPU flip-flop 801, the locking of the memory by the bus will be visible to the CPU and no action will be taken during this time by the CPU when the outcome of the race between the CPU and the bus to lock in the memory is undetermined.

In the preferred embodiment in which the CPU requires about 240 nanoseconds to execute each microinstruction of FIG. 10, this presents no problem because there is assured to be sufficient time between the execution of the microoperation of block 1001 which sets locked by CPU flip-flop 801 and when the output of locked by bus flip-flop 820 is examined by the microoperations of block 1002. However, if the reverse were the case in which the microoperations took less time than the time between the clocking of synchronization flip-flop 802 and the clocking of locked by bus flip-flop 820, the firmware operations of FIG. 10 could still be used as long as there were sufficient microoperations executed between block 1001 and block 1002 to ensure that the block 1002 would not examine the output of flip-flop 820 before it has had time to set and stabilize when the bus just beat the CPU in locking the memory. It should be noted that although block 1002 unconditionally reads the memory each time it is executed, during the time that the bus has the memory locked, the memory data is thrown away because a re-read occurs, so there is never a case in which data read from memory when the memory was locked by the bus will later be used by the CPU because the memory is always re-read if the memory was locked. It should be also noted that although the firmware of FIG. 10 combines the reading of memory and the testing of the bus lock in one microinstruction, these operations could take place in separate microinstructions so long as the looping on the bus lock microoperation precedes the memory read microoperation.

From the above discussion, it can be appreciated that the lock logic 110 of FIG. 8 and the firmware operations of FIG. 10 combined provide a simple mechanism by which two units operating asynchronously can perform lock and unlock operations on a shared resource. In the preferred embodiment this is accomplished by the CPU firmware, once the CPU has determined that sooner or later it requires that it do a lock operation on the memory, unconditionally setting a CPU lock flip-flop without regard to whether the memory has already been locked by the bus. After sufficient time has elapsed to allow the CPU to be guaranteed that a bus lock operation that just beat out the locking of the memory by the CPU has had an opportunity to set the locked by bus flip-flop, the CPU then issues a read command and simultaneously examines the locked by bus flip-flop. If the locked by bus flip-flop has not been set, the CPU is guaranteed that the CPU has won any race and that any subsequent attempt by the bus to perform a lock operation will be given a negative acknowledgement (NAK). The CPU can then examine the locked by bus flip-flop and if the memory has not been locked by the bus, the CPU can then use the data read, modify the data and then write the modified data back into the memory and at the same time the CPU resets the locked by CPU flip-flop. If the CPU firmware finds that the bus has won the race and locked the memory, the CPU firmware continues to loop until such time as it finds that the locked by bus flip-flop has been reset at which time the CPU can read the memory, modify the data, and write the modified data back into the memory and reset the locked by CPU flip-flop.

The CPU is guaranteed that once the memory has become unlocked by the bus that no subsequent bus requests can lock the memory because any further attempt to lock the memory from the bus will not result in the memory being locked by the bus and the unit on the bus requesting to lock the memory will be given a negative acknowledgement which will result in that unit later retrying the lock operation. The lock logic 110 of FIG. 8 operates such that an attempt to lock the memory from the bus will only result in the memory being locked if the memory has not already been locked by either the CPU or the bus. Any attempt to lock the memory from the bus, if the memory is already locked, will result in a negative acknowledgement being generated to the I/O controller and the bus will later retry to lock the memory. Once locked by the bus, the memory will remain locked until such time as the I/O controller on the bus signals the memory via way of an unlocked sequence, at which time the memory will be unlocked by the bus. During the time that the memory is locked by either the CPU or the bus, any unit on the bus can make a memory access request which does not require a lock or unlock memory operation. In the preferred embodiment there is only one CPU and the sequence between when the CPU sets locked by CPU flip-flop 801 and when the memory write operation at the end of a memory locked operation is performed is non-interruptable by any CPU operation which will do a memory write which would prematurely reset locked by CPU flip-flop 801.

In the preferred embodiment, the memory is a shared resource which can be allocated to either a single CPU or to one of a plurality of devices connected to a common bus, however, it is possible to extend this logic to handle the case of multiple CPUs or other type devices. Further, although the invention has been described in terms of the preferred embodiment in which the memory is a shared resource and is shared among the plurality of units connected to a common bus and a CPU this invention is equally applicable to sharing other types of resources that must be allocated to an individual user for a certain operaton during which other users can not be allowed access to the resource.

While the invention has been shown and described with reference to the preferred embodiment thereof, it will be understood by those skilled in the art that the above and other changes in form and detail may be made therein without departing from the spirit and scope of the invention.

What is claimed is:

1. A lock apparatus for use in a data processing system having a plurality of units, a shared unit of said plurality of units capable of being accessed by a first unit and a second unit of said plurality of units, said first unit and said second unit operating asynchronously with respect to one another, said lock apparatus comprising:
   A. first lock request receiver means, included in said shared unit, for receiving a first lock signal, said first lock signal indicating that a unit of said plurlity of units which transmitted said first lock signal, desired uninterrupted access to said shared unit such that no unit of said plurality of units can perform a lock operation on said shared unit during the time said shared unit is locked by another unit of said plurality of units;
   B. first lock storage means, included in said shared unit and coupled to said first lock request receiver means, for storing a first indicator that said first lock signal has been received when an access permitted signal is received by said first lock storage means;
   C. second lock storage means, included in said shared unit, for unconditionally storing a second indicator that said second unit desires uninterrupted access to said shared unit such that no other unit of said plurality of units can perform said lock operation on said shared unit during the time said shared unit is locked by another unit of said plurality of units;
   D. synchronization means, included in said shared unit and coupled to said first lock request receiver means and to said second lock storage means, for storing said second indicator when said first lock signal is received by said first lock request receiver means; and
   E. response means, included in said shared unit and coupled to said synchronization means and said first lock storage means, for generating an access denied signal for said first or said second unit desiring uninterrupted access to said shared unit if said first lock signal is received and if said first lock storage means indicates that said first lock signal has been received or if said synchronizaton means indicates that said second lock storage means indicates that said second unit desires uninterrupted access to said shared unit, said response means for generating said access permitted signal for said first or said second unit desiring uninterrupted access to said shared unit if said first lock signal is received and if said first lock storage means does not indicate that said first lock signal has been received and if said synchronization means does not indicate that said second lock storage means indicates that said second unit desires uninterrupted access to said shared unit.

2. The lock apparatus as in claim 1 further comprising:
   A. first unlock receiving means, included in said shared unit and coupled to said first lock storage means and said response means, for receiving a first unlock signal, said first unlock signal indicating that said unit of said plurality of units which transmitted said first lock signal no longer desires uninterrupted access to said shared unit such that other units can now perform said lock operation on said shared resource; and
   B. first unlock means, included in said first lock storage means and coupled to said first unlock request receiving means and said response means, for resetting said indication that said first lock signal has been received when said access premitted signal is received if said first unlock request receiving means has received said first unlock signal.

3. The lock apparatus as in claim 1 further comprising a looping means coupled to said second unit and said first lock storage means, said looping means for inhibiting said second unit from accessing said shared unit until after sufficient time has elapsed between when said second unit indicated to said second lock storage means that said second unit desired uninterrupted access to said shared unit and when said first lock storage means could have responded to said access permitted signal to set said indicator that said first lock signal had been received after which said looping means then permits said second unit access to said shared resource only if said first lock storage means does not indicate that said first lock signal had been received.

4. The lock apparatus as in claim 3 further comprising a second unlock means, included in said second lock storage means and responsive to a second unlock signal, for resetting said indicator that said second unit desires uninterrupted access to said shared unit.

5. The lock apparatus as in claim 4, further comprising second unlock signal generation means, included in said shared unit and coupled to said second unlock means, for generating said second unlock signal when said shared unit performs an operation that is unique to said second unit and wherein said unique operation is the final operation of all said lock operations performed by said second unit.

6. The lock apparatus as in claim 1 wherein said response means further includes a wait means for generating an access retry signal if said shared unit is busy when said first lock signal is received.

7. The lock apparatus as in claim 1 whereas said shared unit is a memory and wherein said first unit is an I/O controller and is coupled to said memory by a common bus and wherein said second unit is a central processing unit.

8. The lock apparatus as in claim 1 wherein said first lock storage means comprises a J-K type flip-flop and wherein said second lock storage means comprises a J-K type flip-flop.

9. The lock apparatus as in claim 8 wherein said sychronization means comprises a D-type flip-flop.

10. The lock apparatus as in claim 3 wherein said looping means comprises a microoperation which branches as a function of said indicator of said first lock storage means.

11. A data processing system comprising a plurality of units coupled by means of a common bus to transfer information between any two of said plurality of units, a shareable unit of said plurality of units capable of being accessed by any other unit of said plurality of units, said shareable unit also capable of being accessed by a main unit by means other than said common bus, said system capable of having a one of said plurality of units and said main unit making simultaneous asynchronous requests for access to said shared unit, said shareable unit including lock operation logic comprising:
  A. first means for receiving a first lock signal by means of said common bus from said one of said plurality of units which desires uninterrupted access to said shareable unit;
  B. first bistable means, coupled to said first means for receiving, for indicating in response to a positive acknowledgement signal being generated by a response means that said shareable unit is being accessed by said one of said plurality of units from which said first lock signal has been received;
  C. second bistable means, for indicating that said main unit desires uninterrupted access to said shareable unit;
  D. third bistable means, coupled to said second bistable means, for storing the indicator of said second bistable means when said first lock signal is received; and
  E. response means, coupled to said first bistable means and said third bistable means, for generating a positive acknowledgement signal to said plurality of units over said common bus if said first bistable means and said third bistable means do not indicate that any unit desires uninterrupted access to said shareable resource when said first lock signal is received and for generating a negative acknowledgement signal to said plurality of units over said common bus if either said first bistable means or said third bistable means indicates that one of said plurality of units or said main unit desires uninterrupted access to said shareable resource;

12. The lock logic as in claim 11 further comprising:
  A. second means for receiving a first unlock signal by means of said common bus from one of said plurality of units, said second means for receiving coupled to said first bistable means; and
  B. first reset means, coupled to said second means for receiving and said first bistable means, and responsive to said first unlock signal and said positive acknowledgement signal, for resetting said first bistable means so that it no longer indicates that one unit of said plurality of units desires uninterrupted access to said shareable unit.

13. The lock logic as in claim 12 further comprising:

A. looping means, coupled to said main unit and said first bistable means, for examining said indication of said first bistable means in response to the setting of said second bistable by said main unit, said examination by said looping means only starting after sufficient time has elaspsed to allow for the setting of said first bistable means by said positive acknowledgement signal if one of said plurality of units requested uninterruptable access to said shareable unit just before said main unit requests uninterrupted access to said shareable unit; and
  B. second reset means, coupled to said second bistable means and responsive to a second unlock signal which indicates that said main unit no longer desires uninterrupted access to said shareable unit, for resetting said second bistable means in response to said second unlock signal.

14. The lock operation logic as in claim 13 further comprising means coupled to said response means for enabling access to said shareable unit by any of said plurality of units of said main unit which does not indicate that it desires uninterrupted access to said shareable unit.

15. The lock operation logic as in claim 14 wherein said system further comprises logic in each of said plurality of units for enabling the transfer of information between any two of said plurality of units, except said shareable unit, during the time uninterrupted access to said shareable unit is desired by any of said plurality of units.

16. The lock operation logic as in claim 15 wherein said shareable unit is a memory and said main unit is a central processing unit.

17. A method for inhibiting access to a shared resource within a data processing system having a plurality of units operating asynchronously with respect to a main unit, said main unit and a one unit of said plurality of units capable of simultaneously requesting uninterrupted access to said shared resource, said method comprising the steps of:
  A. allowing said main unit to unconditionally set a first indicator that said main unit desires uninhibited access to said shared resource;
  B. receiving a first lock signal from said one unit indicating that said one unit desires uninterruptable access to said shared resource;
  C. synchronizing said main unit's request and said one unit's request for uninterrupted access to said shared resource by storing ths status of said first indicator in a second indicator when said first lock signal is received;
  D. generating a positive response to said one unit when said first lock signal is received if said second indicator does not indicate that said main unit desires uninterrupted access and if a third indicator does not indicate that said first lock signal has been received;
  E. generating a negative response to said one unit when said first lock signal is received is said second indicator indicates that said main unit desires uninterrupted access to said shared resource or if said third indicator indicates that said first lock signal has been received; and
  F. storing said indication that said one unit desires uninterrupted access to said shared resource in said third indicator if said positive response is generated.

18. The method of claim 17 further comprising:

A. examining said third indicator after sufficient time has lapsed after the setting of said first indicator so that if said main unit unit requests uninterrupted access just after said one unit, said third indicator could have been set by said positive response, said examination continuing until said third indicator does not indicate that said one unit desires uninterrupted access to said shared resource; and B. resetting said first indicator when said main unit no longer desires uninterrupted access to said shared resource.

19. The method of claim 18 further comprising resetting said third indicator if a positive acknowledgement is generated in response to an unlock signal from one of said plurality of units.

* * * * *